United States Patent
Jordan et al.

(10) Patent No.: US 9,486,940 B2
(45) Date of Patent: Nov. 8, 2016

(54) RADIATION CURABLE RESIN SYSTEMS FOR COMPOSITE MATERIALS AND METHODS FOR USE THEREOF

(71) Applicant: Autoliv ASP, Inc., Ogden, UT (US)

(72) Inventors: Michael P. Jordan, South Weber, UT (US); Bradley W. Smith, Plain City, UT (US); Geoffrey A. Russell, Ogden, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 755 days.

(21) Appl. No.: 13/718,336

(22) Filed: Dec. 18, 2012

(65) Prior Publication Data
US 2014/0167333 A1  Jun. 19, 2014

(51) Int. Cl.
| | |
|---|---|
| *B29B 15/12* | (2006.01) |
| *C09D 163/00* | (2006.01) |
| *C09D 175/14* | (2006.01) |
| *C08J 5/24* | (2006.01) |
| *C09D 175/16* | (2006.01) |

(52) U.S. Cl.
CPC ............. *B29B 15/122* (2013.01); *C08J 5/24* (2013.01); *C09D 163/00* (2013.01); *C09D 175/14* (2013.01); *C09D 175/16* (2013.01); *C08L 2205/05* (2013.01); *C08L 2312/00* (2013.01)

(58) Field of Classification Search
CPC .................................................... B29B 15/122
See application file for complete search history.

(56) References Cited

U.S. PATENT DOCUMENTS

| | | | |
|---|---|---|---|
| 3,719,728 A | 3/1973 | Miranda | |
| 3,971,711 A | 7/1976 | Araki et al. | |
| 4,369,223 A | 1/1983 | Phillips | |
| 4,377,458 A | 3/1983 | Watanabe | |
| 4,656,208 A * | 4/1987 | Chu | C08G 59/50 428/209 |
| 4,670,348 A | 6/1987 | Sato et al. | |
| 4,929,494 A | 5/1990 | Matsui et al. | |
| 5,011,721 A * | 4/1991 | Decker | C08J 3/24 428/36.9 |
| 5,239,029 A | 8/1993 | Yaguchi | |

(Continued)

FOREIGN PATENT DOCUMENTS

GB  2475352 A *  5/2011 ............. B29C 73/10

OTHER PUBLICATIONS

International Search Report and Written Opinion regarding International Application No. PCT/US2013/074966, ISA/US, mailed May 27, 2014.

(Continued)

*Primary Examiner* — Benjamin Schiffman
(74) *Attorney, Agent, or Firm* — Stephen T. Olson; Harness, Dickey & Pierce, P.L.C.

(57) ABSTRACT

Methods of forming a curable pre-impregnated composite precursor material with radiation (e.g., actinic or electron-beam) curable resin composition systems are provided, as are the curable pre-impregnated composite precursor materials themselves. The resin systems have reversible temperature-viscosity control, which are advantageously used to form curable pre-impregnated composite precursor materials (pre-preg) that can be cured to form a composite article. The uncured resin composition comprises: (a) an acrylate or a methacrylate monomer; (b) an oligomer species selected from the group consisting of: polyethers, polyesters, epoxies, and combinations thereof; and (c) a photoinitiator. The uncured resin has a first viscosity at 21° C. (70° F.) of ≥about 200,000 centipoise (cP) and a second viscosity of ≤about 5,000 cP at 65° C. (149° F.) or above.

23 Claims, 3 Drawing Sheets

(56) References Cited

U.S. PATENT DOCUMENTS

| | | | |
|---|---|---|---|
| 5,593,770 A * | 1/1997 | Mumford | B29C 70/30 428/396 |
| 5,630,874 A * | 5/1997 | Tait | B29B 15/122 118/234 |
| 5,700,607 A | 12/1997 | Rath et al. | |
| 5,716,686 A * | 2/1998 | Black | B29B 15/122 264/134 |
| 5,732,743 A | 3/1998 | Livesay | |
| 5,972,503 A * | 10/1999 | Woodside | B29B 15/122 156/180 |
| 6,099,910 A * | 8/2000 | Woodside | B29B 15/122 427/386 |
| 6,512,021 B1 | 1/2003 | Sugiki et al. | |
| 6,533,882 B1 * | 3/2003 | Woodside | B29B 15/122 156/166 |
| 7,137,182 B2 | 11/2006 | Nelson | |
| 7,709,582 B2 * | 5/2010 | Kouchi | C08G 59/18 525/523 |
| 2002/0011575 A1 | 1/2002 | Vogels et al. | |
| 2002/0019182 A1 * | 2/2002 | Ishibashi | B29B 9/14 442/59 |
| 2002/0176979 A1 * | 11/2002 | Evans | B29B 15/122 428/292.1 |
| 2004/0225027 A1 | 11/2004 | Moens et al. | |
| 2005/0065228 A1 | 3/2005 | Nishida et al. | |
| 2006/0024482 A1 | 2/2006 | Stachurski et al. | |
| 2006/0257576 A1 * | 11/2006 | Santo | B29B 15/122 427/372.2 |
| 2008/0292875 A1 | 11/2008 | Van De Wall | |
| 2009/0004483 A1 | 1/2009 | Fallais et al. | |
| 2010/0193999 A1 | 8/2010 | Anneaux et al. | |
| 2011/0151206 A1 * | 6/2011 | Goto | B29B 15/122 428/196 |
| 2013/0012086 A1 * | 1/2013 | Jones | B29C 73/10 442/66 |

OTHER PUBLICATIONS

"BYK-1790. Silicone-Free Defoamer for Solvent-Free Radiation Curable Systems," Data Sheet D208, BYK USA Inc. (dated Mar. 2010).

"EFKA®—2721. Defoamer for radiation-cured systems" Datasheet (dated Apr. 2001).

"Industrial Coatings. RADCURE™ Energy curable resins," Cytec Industries Inc. (copyright 2010).

"Photoinitiators for UV Curing. Formulators' Guide for Coatings," Ciba, http://www.mufong.com.tw/Ciba/ciba_guid/photo_uv_2.pdf (downloaded on Mar. 19, 2013).

"RADCURE™ Energy Curable Resins. Product Guide—Coatings and Inks," Cytec Industries Inc. (copyright 2012).

"Safety Data Sheet, Efka® 2721," BASF, Version 1.2 (dated Sep. 16, 2010).

"Technical Data Sheet: SR454," Sartomer USA, LLC (dated Jul. 2011).

"Low Cost Manufacturing Processes using UV Cure Resins" Presentation, Composites '97 Manufacturing & Tooling Conference Advisory Committee, Liquid Molding Session: Emerging Low Cost Manufacturing Processes for UV Cure Resins, http://www.sunrez.com/SMEana.pdf (Jan. 21, 1997).

Jockusch, Steffen, et al., "Phosphinoyl Radicals: Structure and Reactivity. A Laser Flash Photolysis and Time-Resolved ESR Investigation," J. Am. Chem. Soc., vol. 120, No. 45, pp. 11773-11777 (1998) (published online Nov. 3, 1998).

* cited by examiner

RADIATION CURABLE RESIN SYSTEMS FOR COMPOSITE MATERIALS AND METHODS FOR USE THEREOF

FIELD

The present disclosure relates to energy curable resin systems, such as radiation cured resin systems used in conjunction with pre-impregnated fabric materials for composites and methods for use thereof.

BACKGROUND

This section provides background information related to the present disclosure which is not necessarily prior art.

Composite articles can be formed by using strips of a composite material, such as a fiber-based material like cloth or graphite tape. Typically, a composite or layup is formed on a mandrel or other work surface that conforms to the desired geometry of the finished composite article. The fiber-based substrate material is applied to the mandrel or shaped work surface. The composite may include one or more layers, where each layer can be formed from contacting and/or overlapping strips of the fiber-based substrate material. In such composites, the fiber-based substrate material also comprises a resin. The resin can be cured after the fiber-based substrate material is applied to the work surface and thus can serve to bond single or multiple layers together in the composite.

One of two methods is typically employed for placing resin in impregnated fiber-based substrate material systems: 1) wet winding/layup or 2) pre-impregnating (referred to as "pre-preg"). For wet winding, the dry fiber is "wetted" with the resin as it is used, usually by submersion through a bath. This method is generally less expensive, but is very messy and the "slickness" of the wet fiber poses difficulty in placing the fiber-based substrate material, as well as keeping it in the proper position, on the shaped work surface or mandrel. The second method, pre-impregnating (pre-preg), involves wetting the resin into the fiber-based substrate material in advance, which has conventionally included a step of partially curing the resin so that it has a tacky consistency (e.g., to a B-stage partial cure state), and then winding up the fiber-based substrate material or storing it for later, subsequent use.

The use of pre-preg materials allows for faster placement of the fiber, is cleaner (much less mess during formation and shaping), and the tacky condition greatly improves the ability to keep the fibers in the proper position during placement and handling prior to full curing. Nearly all pre-preg composite materials in use today are based on thermoset resin systems, which cure when subjected to elevated temperatures. Typical cure times range from 30 minutes to 2 hours depending on the cure temperature. However, such cure times could be reduced and the expensive equipment associated with such techniques required for manufacturing could be significantly improved.

While some pre-preg materials employ ultraviolet radiation (UV) cured resins, these UV resin systems do not lend themselves to a partial cure approach (B-stage curing) available with existing thermoset resins. For example, inconsistent tackiness typically results from UV cured resins, thus resulting in an inhomogeneous resin matrix through the fiber-based material. Hence, partially cured UV curable resins have been avoided in pre-preg systems. As such, new methods of forming pre-preg materials would be desirable that could form composite products having superior quality, improve curing times, and reduce equipment expenses.

SUMMARY

This section provides a general summary of the disclosure, and is not a comprehensive disclosure of its full scope or all of its features.

In various aspects, the present disclosure provides methods for forming curable pre-impregnated composite precursor materials. In certain aspects, the method optionally comprises heating an uncured resin composition to a first temperature so that the uncured resin composition exhibits a first dynamic viscosity of less than or equal to about 5,000 centipoise (cP). The uncured resin composition is curable by actinic radiation or electron-beam radiation and comprises (a) an acrylate or a methacrylate monomer; and (b) an oligomer species selected from the group consisting of: polyethers, polyesters, epoxies, and combinations thereof. In certain aspects, the acrylate or methacrylate monomer has two or more functional groups. In certain variations, the uncured resin composition further comprises an initiator component reactive to the actinic radiation or the electron-beam radiation. The method comprises applying the uncured resin composition to a fiber-based substrate material. Then, the uncured resin composition disposed on the fiber-based substrate material, so that the uncured resin composition exhibits a second dynamic viscosity of greater than or equal to about 200,000 cP.

In other aspects, the present disclosure provides alternative methods of forming a curable pre-impregnated composite precursor material. The method optionally comprises applying an uncured resin composition to a fiber-based substrate material. The uncured resin composition is curable by actinic radiation or electron-beam radiation and comprises: (a) an acrylate or a methacrylate monomer having one or more functional groups; (b) an oligomer species selected from the group consisting of: polyethers, polyesters, epoxies, and combinations thereof, having a viscosity of greater than or equal to about at least 200,000 cP at 25° C. In certain aspects, the acrylate or methacrylate monomer has two or more functional groups. The acrylate or methacrylate monomer may be selected from the group consisting of: bisphenol A ethoxylate diacrylate, trimethylolypropane ethoxylate triacrylate, and combinations thereof, in certain variations. In certain aspects, the oligomer species is selected from the group consisting of: epoxy acrylate oligomers, polyurethane acrylate oligomers, polyester acrylates, and combinations thereof. Furthermore, in yet other aspects, the oligomer species is optionally selected to have a first dynamic viscosity of greater than or equal to about at least 200,000 cP at 25° C. and a second dynamic viscosity of less than or equal to about 5,000 cP at a temperature of 65° C. or above. In certain variations, the uncured resin composition further comprises an initiator component reactive to the actinic radiation or the electron-beam radiation. In certain aspects, the overall uncured resin composition comprising each of these components exhibits a first dynamic viscosity at room temperature (about 21° C. (70° F.)) of greater than or equal to about 200,000 centipoise (cP), while it exhibits a second dynamic viscosity of less than or equal to about 5,000 cP, and in certain aspects optionally less than or equal to about 1,000 cP, at a temperature of 65° C. (149° F.) or above.

In yet other aspects, a curable pre-impregnated composite precursor material is provided by the present disclosure. The precursor material comprises a fiber-based substrate material and an uncured resin composition curable by actinic radiation or electron-beam radiation. The uncured resin composition comprises (a) an acrylate or a methacrylate monomer and (b) an oligomer species selected from the group consisting of: polyethers, polyesters, epoxies, and combinations thereof, having a viscosity of greater than or equal to about at least 200,000 centipoise (cP) at 25° C. (77° F.). In certain aspects, the acrylate or methacrylate monomer has two or more functional groups. In certain variations, the uncured resin composition further comprises an initiator component reactive to the actinic radiation or the electron-beam radiation. In certain aspects, the uncured resin composition has a ratio of monomer species (a) to oligomer species (b) of about 1:10 to about 5:10 and desirably exhibits a first dynamic viscosity at room temperature of 21° C. (70° F.) of greater than or equal to about 200,000 cP and exhibits a second dynamic viscosity of less than or equal to about 5,000 cP at a temperature of 65° C. (149° F.) or above.

In yet other aspects, methods are provided for making a composite article from a curable pre-impregnated precursor material. The method may comprise disposing the curable pre-impregnated composite precursor material comprising an uncured resin composition and a fiber-based substrate material on a shaped surface. The uncured resin composition is curable by actinic radiation or electron-beam radiation and comprises (a) an acrylate or a methacrylate monomer having one or more functional groups; and (b) an oligomer species selected from the group consisting of: polyethers, polyesters, epoxies, and combinations thereof. In certain variations, the uncured resin composition further comprises an initiator component reactive to the actinic radiation or the electron-beam radiation. The uncured resin composition exhibits a first dynamic viscosity at room temperature of 21° C. (70° F.) of greater than or equal to about 100,000 centipoise (cP), but exhibits a second dynamic viscosity at a temperature of greater than or equal to about 75° C. (167° F.) of less than or equal to about 500 cP. The method further comprises exposing the curable pre-impregnated composite precursor material on the shaped surface to a source of actinic radiation or electron-beam radiation for a duration of less than or equal to about 60 seconds so as to cure the resin composition and form the composite article. In certain variations, the final composite article thus formed comprises the shaped surface, the cured resin composition, and the fiber-based substrate material. In other alternative variations, the final composite article comprises the cured resin composition and fiber-based substrate material, which is removed from the shaped surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
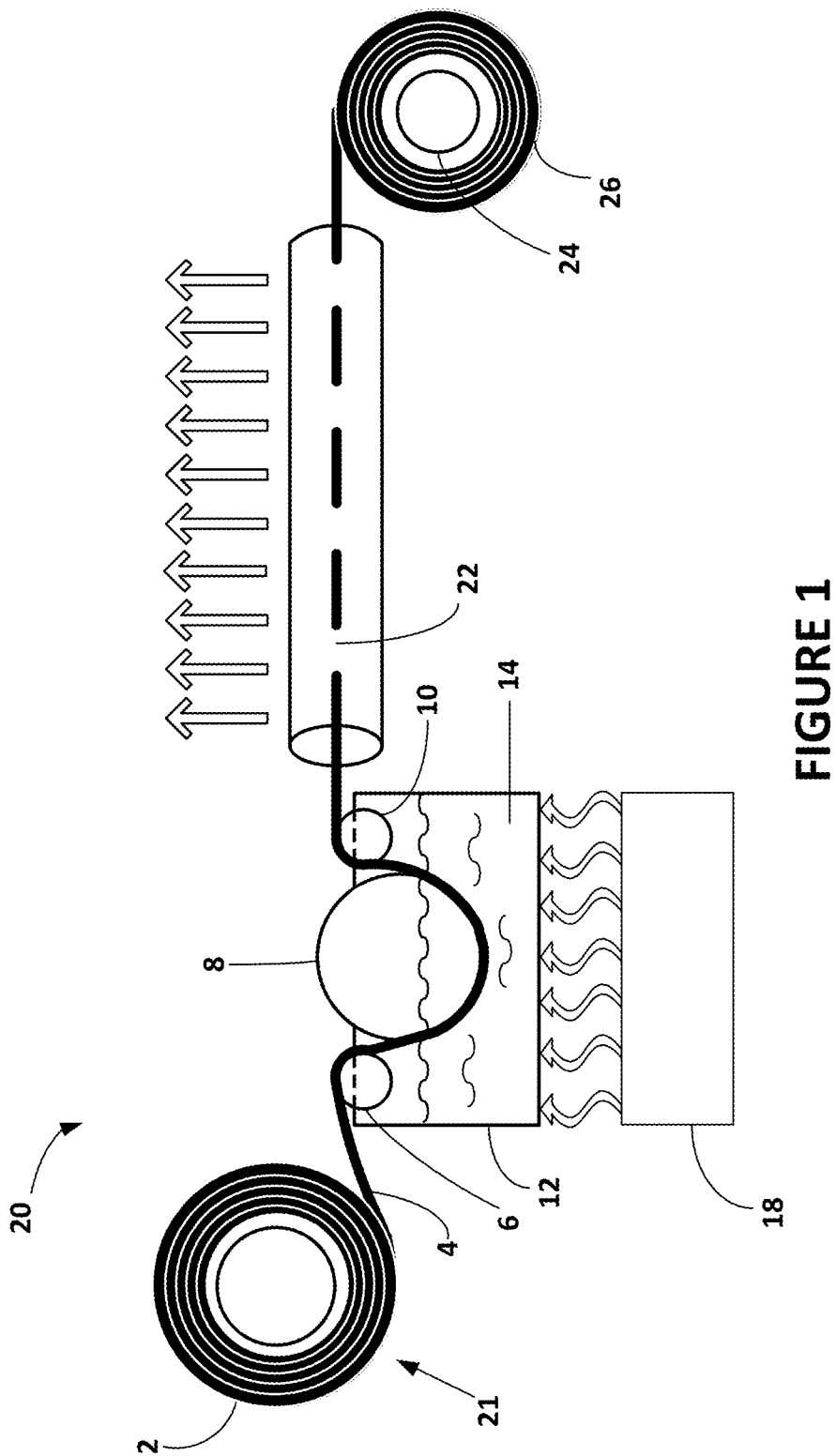
FIG. 1 shows a schematic of an exemplary process for forming a radiation-curable pre-impregnated composite material according to certain aspects of the present teachings.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

The present technology provides in certain aspects, methods of creating resin-containing substrate materials, which are stable for storage and functional for structural use in forming composite materials. In certain aspects, the present teachings provide methods of forming a radiation-curable pre-impregnated ("pre-preg") composite precursor material. The method may optionally comprise applying or introducing an uncured resin composition into or onto a fiber-based substrate material. By applying, it is meant that the uncured resin composition is wetted out onto the fiber-based substrate and thus, may be coated on a surface of the fiber-based substrate material and/or imbibed/impregnated into the fiber-based material (e.g., into the pores or openings within the fiber-based material). In certain aspects, the uncured resin composition is curable by radiation, e.g., actinic radiation or electron-beam radiation. In certain variations, the uncured resin composition comprises: (a) an acrylate monomer or a methacrylate monomer and (b) an oligomer species selected from the group consisting of: polyethers, polyesters, epoxies, and combinations thereof. In certain aspects, the acrylate or methacrylate monomer (a) has two or more functional groups. In certain variations, the uncured resin composition further comprises an initiator component reactive to the actinic radiation or the electron-beam radiation.

In certain embodiments, the uncured resin composition desirably exhibits a first dynamic viscosity at room temperature (about 21° C. (70° F.)) of greater than or equal to about 100,000 centipoise (cP), optionally greater than or equal to about 200,000 cP, optionally greater than or equal to about 400,000 cP, and in certain aspects, greater than or equal to about 600,000 cP, but exhibits a second dynamic viscosity at a higher temperature of greater than or equal to about 65° C. (149° F.) of less than or equal to about 5,000 cP, optionally less than or equal to about 4,000 cP, optionally less than or equal to about 3,000 cP, optionally less than or equal to about 2,000 cP, and in certain aspects, less than or equal to about 1,000 cP. In certain aspects, the uncured resin composition exhibits a second dynamic viscosity at a temperature of 75° C. (167° F.) of less than or equal to about 500 cP. In this manner, the uncured resin composition can be heated so as to have a lower viscosity to facilitate flow and coating of the fiber-based substrate material during preparation of a pre-impregnated composite precursor material, while having a desirably high and consistent viscosity at ambient conditions so that it may provide the desired tackiness and stability during storage to provide a superior pre-impregnated composite precursor material. Notably, this may be achieved without use of any thickeners in the uncured resin composition, but rather can use temperature control alone to successfully form the pre-impregnated composite precursor material, which is stable for long-term storage.

For such resin compositions and systems, which have a combination of (a) acrylate monomers or methacrylate monomers and (b) oligomer species selected from the group consisting of: polyethers, polyesters, epoxies, and combinations thereof, appropriate ratios of (a) to (b) can be selected. Accordingly, radiation-curable resin systems employing such resin compositions are designed to have a pre-selected viscosity behavior, where dynamic viscosity varies significantly and is highly influenced by temperature (where the viscosity is dramatically reduced as temperature is increased). Moreover, the uncured resin composition can then be cured by exposure to actinic or electron-beam radiation.

Thus, the present disclosure provides methods for forming a curable pre-impregnated composite precursor material, which may comprise first heating an uncured resin composition to a first temperature so that the uncured resin composition exhibits a first dynamic viscosity of less than or equal to about 5,000 centipoise (cP). The uncured resin composition comprises (a) an acrylate or a methacrylate monomer; and (b) an oligomer species selected from the group consisting of: polyethers, polyesters, epoxies, and combinations thereof. In certain aspects, the acrylate or methacrylate monomer has two or more functional groups. In certain variations, the uncured resin composition further comprises an initiator component reactive to the actinic radiation or the electron-beam radiation. Secondly, the method may comprise applying the uncured resin composition to a fiber-based substrate material. The method further comprises cooling the uncured resin composition disposed on the fiber-based substrate material, so that the uncured resin composition exhibits a second dynamic viscosity of greater than or equal to about 200,000 cP. In certain variations, a composite article may be formed by exposing the uncured resin composition to a source of actinic radiation or electron-beam radiation for a duration of less than or equal to about 60 seconds to form a cured resin composition. In yet other variations, the curable pre-impregnated composite precursor material can be stored for greater than or equal to 6 months and then used to form a composite article by curing the curable pre-impregnated composite precursor material.

Thus, in various aspects, the present disclosure provides radiation (e.g., actinic or electron-beam) curable resin composition systems having reversible temperature-viscosity control, which is particularly suitable for use in pre-preg fiber-based composite precursors. In certain aspects, use of such radiation curable resin compositions allows for faster placement of the fiber-based material than conventional wet wind composite precursor materials, thus providing a cleaner process producing significantly less mess than conventional wet winding, and an advantageous level and consistency of tackiness that greatly improves the ability to keep the fiber-based substrate materials in the proper position during placement and handling prior to curing, as compared to conventional wet wind materials.

In various aspects, the uncured resin composition has particularly advantageous properties for use in a pre-preg fiber-based composite precursor material, in that the uncured resin composition is tacky and stable for use and storage at room temperature for long durations. Furthermore, the pre-preg fiber-based composite precursor materials according to certain aspects of the present teachings that comprise uncured resin compositions are easily produced by heating the resin to an elevated temperature, where dynamic viscosity is reduced to levels that make it a runny consistency, so that the heated resin composition readily wets out the dry fiber of the fiber-based substrate material to which the resin composition is applied.

An exemplary process of forming a radiation-curable pre-impregnated composite material in accordance with certain aspects of the present teachings is shown in FIG. 1, by way of example. A coating process assembly 20 includes a spool unloading region 21 that receives a roll of substrate material 4 on a spool 2. The substrate 4 is to be impregnated with resin after being unwound from spool 2. Substrate 4 may be a roll of fiber-based material, fabric material, or a conventional roll of pre-preg tow material, by way of non-limiting example. Substrate 4 is unwound from spool 2 and directed towards a first roller 6. First roller 6, second roller 8, and third roller 10 cooperate to draw and unwind substrate 4, so that it passes under tension through receptacle 12 containing a resin composition 14. Thus, substrate 4 passes above first roller 6 and is drawn beneath second roller 8 such that substrate 4 contacts (e.g., is submerged within) a bath of resin 14 in receptacle 12 and is drawn up via third roller 10. A heating device 18 supplies heat (shown by arrows) to resin 14 in receptacle 12, as discussed above to reduce the viscosity of the resin 14 (e.g., to provide it in a liquid and low viscosity state that readily wets the substrate 4). Therefore, as substrate 4 passes into contact with resin 14, the resin 14 is deposited, coated on, and/or impregnated within substrate 4. Upon exiting heat bath in receptacle 12, resin-coated substrate 4 winds above third roller 10. As appreciated by those of skill in the art, a quantity of resin 14 applied to substrate 4 can be metered through the use of a squeegee, opposing rollers or doctor blade, pump, and the like, which are not shown, but are well known to those of skill in the art. It should be noted that the configuration, arrangement, design, and number of rollers and other components in the coating process assembly discussed just above and further herein are merely exemplary and may be modified as appreciated by those of skill in the art.

Resin-coated substrate 4 is then drawn through a cooling tunnel 22. Cooling tunnel 22 facilitates passing of air (shown by arrows) or other cooling fluids by or through the resin-coated substrate 4 (which may contain residual heat from the heated resin 14 from receptacle 12). By reducing the temperature of the resin-coated substrate 4, a viscosity of the resin 14 increases significantly in accordance with certain aspects of the present teachings (without requiring any curing or cross-linking step). Thus, the wetted resin-coated substrate 4 is passed through the cooling tunnel 22 to reduce the resin viscosity to a very thick, tacky consistency, prior to spooling it up for storage and future use. After passing through the cooling tunnel 22, the resin-coated substrate 4 is then wound on a bobbin 24 to form a cooled radiation-curable pre-impregnated ("pre-preg") roll of composite precursor material 26. In certain embodiments, the cooled roll of composite material 26 can be stored in an opaque bag (that is substantially non-transmissive to ultraviolet radiation, for example) until needed. During storage, the applied resin of this pre-preg composite precursor material 26 stays in place and does not "weep" out of the spooled up substrate 4. When needed, the material may be warmed slightly, either on the roll or bobbin 24 of composite precursor material 26 itself or on a mandrel (not shown), before component shaping and curing. Because of the reversible nature of the resin composition in the pre-preg system, lower viscosity and good wetting between layers of wrap may be accomplished, if desired, by this warming process before cure. Thus, during subsequent use, the pre-preg composite precursor material 26 comes smoothly off the roll 24 and readily sticks to the mandrel, underlying part, or inner fiber layers.

Furthermore, in certain aspects, composite articles or parts made using this pre-preg composite precursor material prepared in accordance with the inventive principles can be wrapped on a target surface in less than or equal to about 60 seconds, optionally less than or equal to about 30 seconds, optionally less than or equal to about 20 seconds, and in certain preferred aspects, optionally less than or equal to about 15 seconds. Furthermore, in certain variations, composite articles or parts made using this pre-preg composite precursor material can be cured by actinic radiation (e.g., UV light) or electron-beam radiation in less than or equal to about 60 seconds, optionally in less than or equal to about 30 seconds, optionally in less than or equal to about 20 seconds, optionally in less than or equal to about 15 seconds, and in certain preferred aspects, in less than or equal to about 10 seconds, thus demonstrating that the inventive technology can be used to rapidly make articles in processes compatible with current, conventional manufacturing methods.

The term "composite article" generally refers to a material that is formed from a pre-impregnated composite precursor material. A "pre-impregnated composite precursor material" is used generically herein to refer to a composite resin matrix (comprising an uncured resin composition) and a substrate, such as a fiber-based substrate material. The resin composition is uncured as described herein and may include at least one monomer and at least one oligomer, where at least one component present in the uncured resin composition is reactive to actinic radiation or electron-beam radiation to facilitate curing or the resin composition. In certain aspects, at least one initiator component reactive to actinic radiation or electron-beam radiation is further introduced into the resin composition, as described below. The resin composition in the pre-impregnated composite precursor material can thus be subsequently cured to form a polymeric material. Suitable substrate materials may include fiber-based substrates, polymeric substrates, and metal foil, although the present teachings are not limited to the materials listed above, but rather can be used with any suitable substrate material that can form a tow, strip, tape, or sheet. As those skilled in the art will appreciate, material selection for the substrate material is dependent on the application in which the composite article will be used and different substrate materials may be applied in alternate layers to provide the composite lay-up with desired characteristics.

Fiber-based or fiber-reinforced composite materials are generally categorized as tow, tape, woven cloth, non-woven cloth, paper, and mixtures thereof. As used herein, fiber-based substrates may include tow materials. Thus, fiber-based substrates include tape, tow, cloth, and any other materials that are commonly used as pre-preg substrates. "Tape" generally refers to uniaxial reinforcement fibers that extend along a single axis of the strip material. "Tow" is a type of substrate that typically comprises untwisted bundles of continuous filaments. Tow filaments often comprise carbon or glass. The term "cloth" generally refers to reinforcement fibers laid along at least two different axes within the material. Cloth is commercially available as bi-axial, tri-axial and quad-axial, indicating fibers extending in two, three, or four different axes, respectively. The fibers may optionally be woven with one another, or may be manufactured as non-woven cloth. A vast array of composite reinforcement fibers are commercially available, such as for example, carbon, Kevlar® fibers, glass, basalt, aramid, other known fiber types, and any combinations thereof, by way of non-limiting example.

Metal foils are also known in the art, and may be included in composite articles. Such metal foils are frequently interspersed as material layers within the lay-up composite. Substrate materials are commercially available in a wide variety of widths. One common width for fiber-reinforced substrate material is a strip with a 6 inch width.

Thus, the fiber-based substrate of the pre-impregnated composite precursor material may comprise fibers or particles. When resin is distributed throughout the fibers or particles, a composite or matrix is formed that is the pre-impregnated composite precursor material (generally referred to as "pre-preg"), which can then be spooled onto rolls.

In certain aspects, the resin compositions for use in accordance with the present disclosure are energy curable, in that the resin polymerizes upon exposure to radiant energy. Actinic or radiant energy curing (e.g., ionizing radiation) of resin allows a rapid, nearly instantaneous curing, resulting in drying/hardening of the resin, which permits much higher production speeds. By "curing" it is meant that at least one component in the resin composition is polymerized, i.e., it undergoes a reaction via a polymerization reaction mechanism, generally initiated by activation of a curing agent species, and can proceed by a cationic route or a free radical route, for example. Such curing hardens/dries the resin and creates a cured polymeric composite matrix within the fiber-based substrate. In various aspects, the resin compositions are curable upon exposure to actinic radiation, such as UV irradiation. In certain alternate aspects, the resin compositions are curable in response to electron-beam (e-beam) radiation.

For example, in certain aspects, one or more radiation sources used in an exemplary manufacturing process produce ultraviolet electromagnetic radiation, generally having a wavelength between about 1 nm to about 400 nm, more typically between about 180 nm to about 400 nm. Such UV radiation sources may also emit some visible light (above about 400 nm to about 1 μm (usually up to about 700 nm)). In this regard, it should be appreciated that a source of radiant energy is exemplary and described according to its predominant emissions, but may emit several different types of radiant energy. In certain alternate aspects, an electron-beam source of radiation energy provides a direct beam of electrons that is absorbed by the resin composition, and in certain aspects, may generate x-ray radiation as well (having an exemplary wavelength ranging from 0.1 nm to 40 nm).

In various aspects, the disclosure provides a method for introducing an energy curable resin system onto a fiber-based material. The uncured resin may then be cured by applying a radiation source, for example, UV irradiation, to form a cured polymeric material. In certain aspects, the resin is hardened by curing. Such a method provides unexpectedly superior quality, adhesion, and resin coverage in a pre-impregnated composite precursor material. The present disclosure also provides an energy curable resin system composition system for use with a fiber-based technology. In various aspects, the curable resin composition comprises (a) acrylate monomers or methacrylate monomers and (b) oligomer species selected from the group consisting of: polyethers, polyesters, epoxies, and combinations thereof. In certain embodiments, (c) one or more initiator components reactive to actinic radiation or electron-beam radiation are also included in the curable resin composition. In some aspects, the curable resin composition has a viscosity of greater than or equal to about 100,000 cP at 21° C. (70° F.), but less than or equal to about 5,000 cP at a second temperature of greater than or equal to about 65° C. (149° F.). In certain aspects, the curable resin composition has a viscosity of greater than or equal to about 200,000 cP at 21° C. (70° F.), but less than or equal to about 1,000 cP at a second temperature of greater than or equal to about 65° C. (149° F.). In certain other aspects, the curable resin composition has a viscosity of greater than or equal to about 500,000 cP at 21° C. (70° F.), but less than or equal to about 500 cP at a second temperature of greater than or equal to about 65° C. (149° F.). In some aspects, the curable resin composition has a viscosity of greater than or equal to about 500,000 cP to less than or equal to about 1,000,000 cP at 21° C. (70° F.). In yet other aspects, the curable resin composition has a viscosity of greater than or equal to about 100,000 cP at 21° C. (70° F.), but less than or equal to about 500 cP at a second temperature of greater than or equal to about 75° C. (167° F.). The curable resin composition coats a surface of the fiber-based material and in certain variations may also impregnate and fill openings or voids within the fiber-based material substrate.

Curable Resin Composition

The disclosure provides resin composition systems that are particularly suitable for forming pre-impregnated composite precursor materials for forming composite articles. As described above, in various aspects of the disclosure, an uncured resin composition curable by exposure to actinic radiation or electron-beam radiation is applied to a substrate, such as a fiber-based substrate. The resin composition comprises (a) acrylate monomers or methacrylate monomers and (b) oligomer species selected from the group consisting of: polyethers, polyesters, epoxies, and combinations thereof. In certain variations, (c) one or more initiator components reactive to actinic radiation and/or electron-beam radiation is also included in the uncured resin composition. It is understood that while general attributes of each of the above categories of curable resin composition components may differ, there may be some common attributes and any given material may serve multiple purposes within two or more of such categories of components.

In certain variations, the curable resin composition may comprise a compound reactive to a radiation source, such as a photoinitiator that is reactive to actinic energy, like a UV energy source. In certain alternate aspects, the curable resin composition is not limited to those initiator compounds that are reactive solely to UV radiation, but may include compounds that are reactive to other sources of radiant energy that cure and harden the polymer, including electron-beam radiation or others known or to be developed in the art. Thus, in certain variations, the curable resin composition may comprise a compound reactive to electron-beam energy.

Initiator compounds that are "reactive to" a source of radiant energy generally means that such compounds undergo hemolytic fission (creating free radicals) and/or heterolytic fission (creating cations and anions) upon exposure to certain types of radiant energy. The free radicals and/or cations then combine with various monomers or oligomer molecules (which have one or more functional groups capable of undergoing polymerization reactions) present in the curable resin composition to form a polymer. As described below, an exemplary initiator compound may be a photoinitiator that is activated to release either a cation or free radical upon exposure to certain wavelengths of ultraviolet radiation. Similarly, an exemplary initiator compound is an electron-beam active compound that undergoes polymerization when exposed to electrons from the electron-beam.

In certain aspects, the resin compositions may have one or more additional additives, such as air release components, fiber wetting components, components having other functions, vehicles, or other constituents that vary in composition or concentration.

A polymer matrix may be formed on a substrate, for example, a fiber-based substrate. In various aspects, the curable resin composition comprises two distinct polymerizable species, the (a) acrylate monomers or methacrylate monomers and (b) oligomer species selected from the group consisting of: polyethers, polyesters, epoxies, and combinations thereof, as well as an optional (c) one or more photoinitiators reactive to the actinic radiation or initiator components reactive to the electron-beam radiation.

The term "monomer" means a single compound having molecules that can be reacted with other monomers to form oligomers or polymers. "Oligomers" are polymers having relatively few monomers (only have relatively few structural units (for example, 2-5 repeating units or monomers)) and are often considered polymeric intermediate compounds. By "uncured," it is meant that the resin composition has reactive functional groups present in the monomers or oligomers having the capability to react via a polymerization, cross-linking, or curing reaction.

Thus, the resin composition comprises one or more compounds that are capable of undergoing polymerization either when activated by UV radiation or upon exposure to e-beam radiation. Such polymerizable compounds are species, such as monomers or oligomers, which can contain one or more functional groups. In certain aspects, an initiator compound is also a polymerizable compound. The resin optionally comprises one or more additional compounds (e.g., the monomer(s) and oligomer(s)) capable of undergoing polymerization that are distinct from the initiator compound(s). A plurality of various polymerizable compounds may also be provided. Suitable examples of polymerizable compounds are described below in the context of both the photoinitiator compounds reactive to actinic radiation and light and polymerizable compounds reactive to electron-beam energy.

Monomer Component

According to various aspects of the present teachings, the resin compositions comprise monomers of acrylate or methacrylate polymers. In certain variations, such acrylate or methacrylate monomers may have two or more functional groups, i.e., polyfunctional. In certain variations, monofunctional acrylate or methacrylate monomers may be avoided, because any unreacted monomer could potentially plasticize the resin composition and thus weaken it. However, in alternative variations, monofunctional monomers may be included at relatively low concentrations.

Examples of suitable monomers include, but are not limited to, bisphenol A ethoxylate diacrylate; bisphenol A ethoxylate dimethacrylate; bisphenol A propoxylate diacrylate; bisphenol A propoxylate dimethacrylate; $C_6$-$C_{12}$ hydrocarbon diol diacrylates; $C_6$-$C_{12}$ hydrocarbon diol dimethacrylates; tripropylene glycol diacrylate; tripropylene glycol dimethacrylate; neopentyl glycol diacrylate; neopentyl glycol dimethacrylate; higher functionality monomers, such as trimethylolpropane triacrylate; trimethylolethane triacrylate; pentaerythritol tetracrylate; ether modified monomers, such as neopentyl glycol propoxylate diacrylate; neopentyl glycol propoxylate dimethacrylate; neopentyl glycol ethoxylate diacrylate; neopentyl glycol ethoxylate dimethacrylate; trimethylolypropane triethoxylate triacrylate; trimethylolypropane trimethoxylate triacrylate; pentaerythritol tetraethoxylate tetraacrylate; polyalkylene glycol di(meth)acrylates; triethylene glycol diacrylate; polyethylene glycol nonylphenylether acrylate; polyethylene glycol nonylphenylether methacrylate; polypropylene glycol nonylphenylether acrylate; polypropylene glycol nonylphenylether methacrylate; isobornyl acrylate; and the like, as well as any combinations thereof.

In certain aspects, particularly suitable monomers include bisphenol A ethoxylate diacrylate; trimethylolypropane ethoxylate triacrylate; and combinations thereof. One particularly suitable monomer is a difunctional bisphenol A ethyoxylate diacrylate commercially available from Cytec as EBECRYL™ 150, which has a viscosity at 25° C. of 1,347 cP. Another particularly suitable example of a monomer is a 3 mole ethoxylated trimethylolpropane triacrylate, which is a fast curing monomer for use in free radical polymerization commercially available from Sartomer as SR454 that has a viscosity at 25° C. of 60 cP.

The curable resin composition optionally contains greater than or equal to about 5% by weight of the acrylate and/or methacrylate monomer compounds, optionally greater than or equal to about 10% by weight of the monomer compounds, optionally greater than or equal to about 15% by weight of the monomer compounds, and in certain variations, optionally greater than or equal to about 25% by weight of the monomer compounds in the overall curable resin composition. In certain aspects, the resin composition comprises greater than or equal to about 5% to less than or equal to about 30% by weight of the acrylate and/or methacrylate monomer species, optionally greater than or equal to about 10% to less than or equal to about 27% of the monomer species, optionally greater than or equal to about 20% to less than or equal to about 25% of the monomer species and in certain embodiments, optionally greater than or equal to about 21% to less than or equal to about 23% of the monomer species in the total weight of the resin composition. Mixtures and combinations of any suitable monomer are further contemplated.

Oligomer Component

According to various aspects of the present teachings, the resin compositions comprise curable oligomer species. In certain variations, the oligomer species (b) are selected from the group consisting of: polyethers, polyesters, epoxies, and combinations thereof. Generally, the oligomers are selected based on their ability to be cured with UV or e-beam energy and furthermore are selected based upon their viscosity at both ambient and elevated temperatures. In certain variations, suitable oligomers have an average functionality of about 2 to 6. In certain aspects, oligomers having a molecular weight between about 300 and about 1,000, and optionally about 400 to about 600 g/mol, can be selected, for example. Furthermore, in certain variations, the oligomer is selected to have a viscosity of greater than or equal to about 200,000 cP at 25° C. In other variations, the oligomer that has such a viscosity at 25° C. also has a viscosity of less than or equal to about 5,000 cP at a temperature of 65° C. or above.

Examples of suitable reactive or curable oligomers include, without limitation, oligomers having at least one, preferably more than one, ethylenically unsaturated double bonds, such as epoxy acrylate oligomers, polyurethane acrylate oligomers, polyester acrylates, and combinations thereof. Particularly suitable epoxy acrylate oligomers are difunctional, while in certain aspects, preferred urethane acrylate oligomers comprise aromatic diisocyanates and are hexafunctional. Suitable polyesters may be tetrafunctional or hexafunctional. Such oligomers with reactive functionality can be cured by adding UV or e-beam initiator (or the oligomers may themselves be reactive upon exposure to e-beam energy) to the polymer and then subjecting the polymer to UV light or electron-beam, for example.

In certain aspects, the oligomer may comprise an aliphatic, a cycloaliphatic, novolac, or a bisphenol A difunctional epoxy component. Thus, in certain preferred variations, the oligomer comprises a difunctional epoxy component. Suitable epoxy resin oligomers include bisphenol A epoxy resin; bisphenol F epoxy resin; alicyclic epoxy resin; bisphenol A epoxy resin acrylates or methacrylates; alkoxylated bisphenol epoxy resin acrylates of methacrylates, alkyl epoxy resin; bisphenol A diacrylate, propoxylated bisphenol A di(meth)acrylate, ethoxylated bisphenol A di(meth)acrylate, bisphenol F diacrylate, ethoxylated bisphenol F diacrylate, propoxylated bisphenol F diacrylate, and the like; and combinations thereof.

The epoxy acrylate oligomers are also known as vinyl esters. Vinyl ester oligomers can be produced by reacting epoxy resins with ethylenically unsaturated carboxylic acids. Bisphenol A epoxy resins can be used. Common acids used to esterify the epoxy resins are acrylic acid and methacrylic acid. The resulting epoxy acrylates or epoxy methacrylates (collectively termed epoxy(meth)acrylates) can then be cured in free radical reactions (homopolymerization) or used with unsaturated monomers (copolymerization).

Other suitable oligomers may be polyether based oligomers, which comprise alkylene oxide adducts and may also include functional groups, such as unsaturated or vinyl groups. Typical alkylene oxide adducts are propylene oxide, ethylene oxide, and combinations thereof. For example, polyether-based (meth)acrylate oligomers can include derivatives of polyethylene glycol, derivatives of polypropylene glycol, and ethylene oxide adducts of bisphenol A. Urethane acrylate oligomers are based on an aliphatic polyether polyols, which are typically reacted with an aliphatic or aromatic polyisocyanate followed by acrylation. Certain preferred variations of urethane acrylate oligomers comprise aromatic diisocyanate and are hexafunctional.

Unsaturated polyesters are commonly referred to as "alkyds" and are formed by the condensation of polyols and polycarboxylic acids, typically with olefinic unsaturation coming from one of the reactants, usually the acid. In certain variations, the oligomers include alcohols, or polyols, reacted with acids. In certain variations, the polyester based oligomers are tetrafunctional or hexafunctional. Common starting materials for producing unsaturated polyesters include glycols such as propylene glycol, ethylene glycol, dipropylene glycol, diethylene glycol, trimethyl pentanediol, neopentyl glycol, propoxylated bisphenol A, hydrogenated bisphenol A, and the like. Common diacids include by way of non-limiting example, terephthalic acid, fumaric acid, adipic acid, glutaric acid, chlorendic acid, isophthalic acid and the like. Alternatively, anhydrides such as phthalic anhydride, maleic anhydride, tetrabromophthalic anhydride and tetrachloro phthalic anhydride can be used as acid reactants.

One particularly suitable oligomer for use in accordance with certain variations of the present disclosure is a difunctional epoxy acrylate oligomer-bisphenol A epoxy diacrylate having a molecular weight of about 500 g/mol and sold as EBECRYL™ 3700 by Cytec Industries. EBECRYL™ 3700 has a viscosity of 800,000 cP at 25° C. and 2,317 cP at a temperature of 65.5° C.

The curable resin composition optionally contains greater than or equal to about 60% by weight of the oligomer species, optionally greater than or equal to about 65% by weight of the oligomer species, optionally greater than or equal to about 70% by weight of the oligomer species, optionally greater than or equal to about 75% by weight of the oligomer species, optionally greater than or equal to about 80% by weight of the oligomer species, optionally greater than or equal to about 85% by weight of the oligomer species, and in certain variations, optionally greater than or equal to about 90% by weight of the oligomer species in the overall curable resin composition. In certain aspects, the curable resin composition comprises greater than or equal to about 60% to less than or equal to about 95% by weight of the oligomer species, optionally greater than or equal to about 65% to less than or equal to about 90% of the oligomer species, optionally greater than or equal to about 70% to less than or equal to about 80% of the oligomer species, and in certain variations, optionally greater than or equal to about 74% to less than or equal to about 76% of the oligomer species in the total weight of the resin composition. Mixtures and combinations of any suitable oligomer are further contemplated.

As noted above, the curable resin systems for use in the pre-impregnated composite precursor materials are designed to have a pre-selected viscosity behavior, where dynamic viscosity varies significantly and is highly influenced by temperature (where the viscosity is dramatically reduced as temperature is increased). In certain aspects, this viscosity behavior is achieved by a pre-selected ratio of monomer to oligomer in the curable resin compositions.

Figure 2:
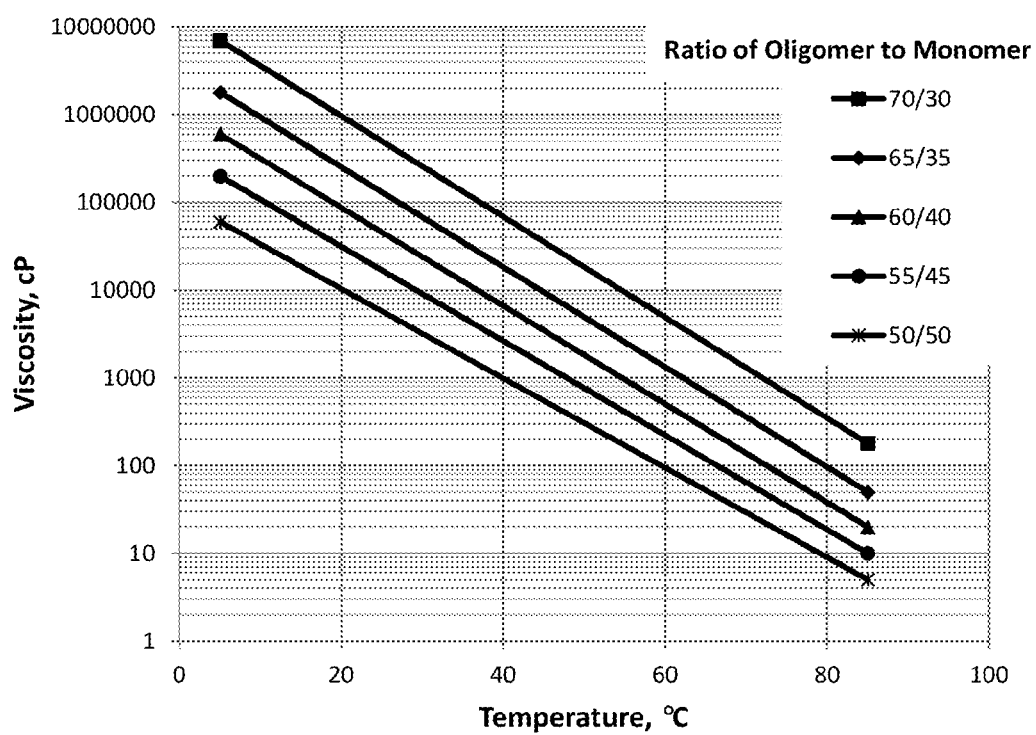
FIG. 2 shows a relationship of dynamic viscosity to temperature for exemplary oligomer to monomer ratios for exemplary UV curable resin composition systems according to certain principles of the present teachings.

FIG. 2 graphically illustrates principles of a relationship of dynamic viscosity to temperature for certain examples of UV curable resin composition systems (comparing different oligomer to monomer ratios). A radiation curable (e.g., actinic or electron-beam curable) resin composition with reversible temperature-viscosity control is shown. For example, in accordance with certain aspects of the present teachings, an uncured resin composition desirably has a viscosity of greater than or equal to about 100,000 cP at room temperature (about 20°-21° C. (68° F.-70° F.)), and in certain aspects, optionally greater than or equal to about 200,000 cP at room temperature (20°-21° C.), optionally greater than or equal to about 400,000 cP at room temperature (20°-21° C.), optionally greater than or equal to about 600,000 cP at room temperature (20°-21° C.), so as to provide a desired tacky condition or property for effective use in the pre-preg composite precursor material. Furthermore, in certain variations, the same uncured resin composition has a viscosity of less than or equal to about 5,000 cP, optionally less than or equal to about 1,000 cP, and in certain variations, less than or equal to about 500 cP at a temperature of greater than or equal to about 65° C. (149° F.) or at about 70° C. (158° F.), which enables effective wetting out of the resin on the fiber substrate and pulling efficiently through the pre-preg manufacturing process.

As an example, FIG. 2 shows an exemplary resin viscosity versus temperature relationship for Examples 1-5, showing the principles by which different ratios of monomer to oligomer effect viscosity behavior. Notably, FIG. 2 generally shows exemplary oligomer to monomer ratios to illustrate certain principles by which the present disclosure operates, but does not reflect specific experimental data. A first example has a ratio of 70% of a first monomer to 30% of a second monomer. A second example has a ratio of 65% of the first monomer to 35% of the second monomer. Similarly, a third example has a ratio of 60% of the first monomer to 40% of the second monomer. A fourth example has a ratio of 55% of the first monomer to 45% of the second monomer. Lastly, a fifth example has a ratio of 50% of the first monomer to 50% of the second monomer.

The first example (having a ratio of 70% of a first monomer to 30% of a second monomer) and the second example (having a ratio of 65% of the first monomer to 35% of the second monomer) exhibit desired characteristics, where heating of the uncured resin composition to above 65° C. during the wetting process has a viscosity of less than or equal to about 5,000 cP. Further, when the uncured resin composition is subsequently cooled back to room temperature (about 20°-21° C.) prior to spooling it up, the resin composition has a viscosity of greater than or equal to about 200,000 cP.

An interesting property of the combined curable oligomer-monomer resin composition systems according to certain aspects of the present teachings is that they can be designed to have a dynamic viscosity that changes very rapidly with changes in temperature (like the system shown in FIG. 2). One advantage of the ability to use temperature for a viscosity control in a pre-impregnated composite precursor material is simplicity of formula and relatively quick and reversible (within a time span of a few seconds) conversion of the thin, easy to impregnate resin to a thick non-flowing condition.

In certain embodiments, the uncured resin composition has a ratio of monomer species to oligomer species of about 1:10 to about 5:10, optionally about 1:9 to about 1:2.5, and in certain variations, 1:3 to about 1:4, and in yet other variations about 1:1.33.

Figure 3:
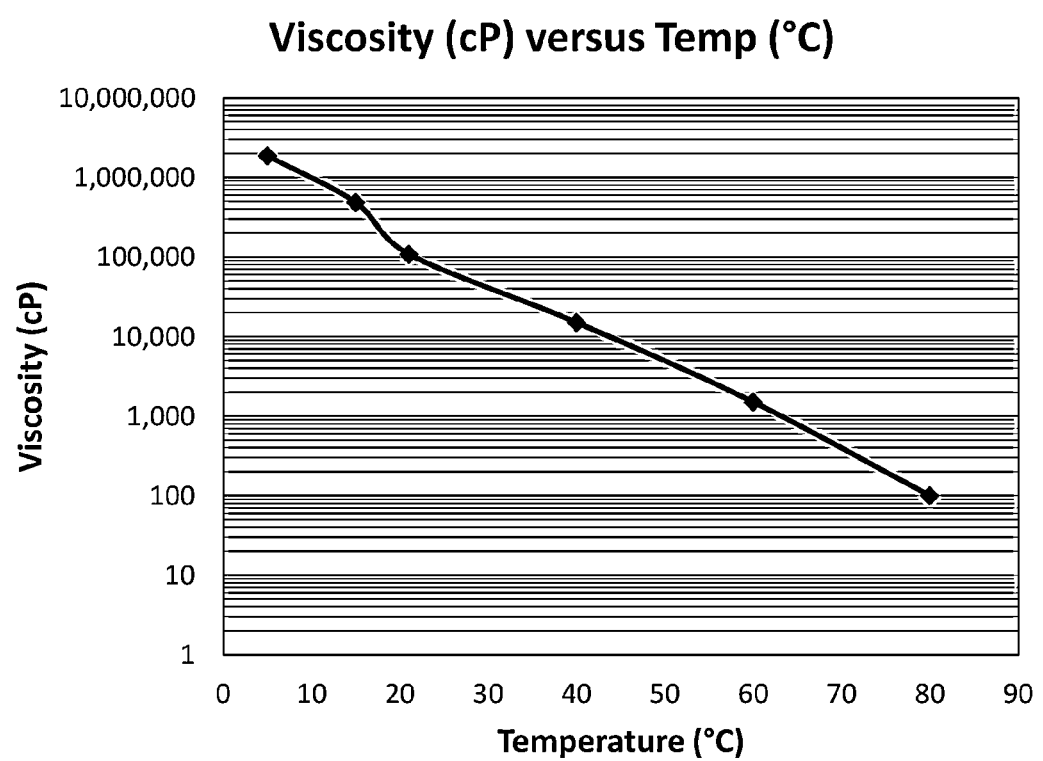
FIG. 3 shows a relationship of viscosity to temperature for certain resin compositions according to certain aspects of the present teachings.

FIG. 3 shows a relationship of viscosity to temperature for one embodiment of the present disclosure, as will be discussed further below. A resin ratio (or monomer (a) to oligomer (b)) is selected so as to provide a viscosity between 100 and 5,000 cP when the resin is warmed to a temperature between 38° C. (100° F.) and 82° C. (180° F.). The corresponding viscosity when cooled to a temperature of 20° C. (70° F.) is modified to be between 200,000 and 1,000,000 cP. The viscosity when the temperature is reduced to 5° C. (41° F.) is greater than 1,000,000 cP.

Thus, in certain aspects, the curable resin composition optionally has a viscosity of greater than or equal to about 100,000 cP at 21° C. (70° F.). In certain aspects, the viscosity of the resin composition is greater than or equal to about 200,000 cP at 21° C. (70° F.); optionally greater than or equal to about 400,000 cP at 21° C. (70° F.); optionally greater than or equal to about 500,000 cP at 21° C. (70° F.); and in certain aspects, optionally greater than or equal to about 600,000 cP at 21° C. (70° F.). In certain variations, the curable resin composition has a viscosity of greater than or equal to about 500,000 cP to less than or equal to about 1,000,000 cP at 21° C. (70° F.).

The resin compositions of the present disclosure are not limited to the recited polymerizable monomer or oligomer compounds ratios or compositions. Further, the resin compositions of the disclosure optionally include mixtures and combinations of any such polymerizable compounds, described above. Any compound known or to be developed in the art that forms a polymer matrix in a resin composition is suitable and contemplated by the present disclosure. Furthermore, in various aspects, the resin is solvent-free.

Initiator Components

One or more initiator components reactive to actinic radiation or electron-beam radiation can be included in the resin composition. Photoinitiators and/or photocatalysts are well known in the art and include any compound that produces a free radical or cationic species upon exposure to radiant actinic energy in the ultraviolet or visible radiation of the electromagnetic spectrum (for example having wavelengths ranging from about 1 nm to about 1 µm) to initiate a polymerization reaction in the resin composition. Such photoinitiator compounds typically have unsaturated molecules (e.g., aromatic or aryl carbon rings) that readily form free radicals upon exposure to UV energy. In this regard, while not limiting as to the principles by which the photoinitiator works, it is theorized that the photoinitiator compound absorbs light energy and converts it to free radicals that initiate polymerization for other polymerizable species present in the resin.

Examples of suitable photoinitiator compounds include, without limitation, phosphine oxides and acyl phosphines, such as 2,4,6-trimethylbenzoyldiphenylphosphine oxide and bis(acyl)phosphine oxides (BAPO), such as bis(mesitoyl) phenylphosphane oxide, (2,4,6-Trimethylbenzoyl)diphenylphosphine oxide, bis-(2,6-dimethoxybenzoyl)-phenylphosphine oxide, bis(2,6-dimethoxybenzoyl)-2,4,4-trimethylpentylphosphine oxide, bis(2,4,6-trimethylbenzoyl)-phenylphosphine oxide, and bis(2,4,6-trimethylbenzoyl)-2,4,4-trimethylpentylphosphine oxide; triphosphine oxides; aromatic ketones, including benzophenones and acetophenones, such as trimethylbenzophenone, isopropylthioxanthone, benzophenone, 2-chloro and 2-ethyl-thioxanthone, 2,2-dimethoxy-2-phenylacetophenone, 2,2-diethoxyacetophenone, 2-hydroxy-2-methyl-1-phenyl-propanone, oligo-[2-hydroxy-2-methyl-1-[4-(1-methylvinyl)phenyl]propanone, 1-hydroxycyclohexyl-acetophenone, and 2-ethyl-hydroquinone; benzoin ethers such as benzoin methyl ether, benzoin ethyl ether, benzoin phenyl ether, and the like; alkylbenzoins such as methylbenzoin, ethylbenzoin, and the like; benzyl derivatives including benzyldimethylketal; 2,4,5-triarylimidazole dimers including 2-(o-chlorophenyl)-4,5-diphenylimidazole dimer, 2-(o-chlorophenyl)-4,5-di(m-methoxyphenyl)imidazole dimer, 2-(o-fluorophenyl)-4,5-phenylimidazole dimer, 2-(o-methoxyphenyl)-4,5-diphenylimidazole dimer, 2-(p-methoxyphenyl)-4,5-diphenylimidazole dimer, 2,4-di(p-methoxyphenyl)-5-phenylimidazole dimer, 2-(2,4-dimethoxyphenyl)-4,5-diphenylimidazole dimer, and so on; acridine derivatives such as 9-phenylacridine and 1,7-bis(9,9'-acridinyl)heptane; N-phenylglycine; aromatic ketones such as trimethylbenzophenone, isopropylthioxanthone, benzophenone, 2-chloro and 2-ethyl-thioxanthone, 2,2-dimethoxy-2-phenylacetophenone, 2,2-diethoxyacetophenone, 2-hydroxy-2-methyl-1-phenyl-propanone, oligo-[2-hydroxy-2-methyl-1-[4-(1-methylvinyl)phenyl]propanone, 1-hydroxycyclohexyl-acetophenone, and 2-ethyl-hydroquinone; and combinations of these. Other non-limiting examples of photoinitiators include alphahydroxy ketones such as 2-hydroxy-2-methyl-1-phenylpropanone. Other classes of suitable photoinitiator compounds include alpha aminoketones, thioxanthones and amine coinitiators. Mixtures and combinations of any suitable photoinitiators are further contemplated.

Commercial photoinitiators are available, for example, from Ciba and Cytec. For example, a 2,4,6-trimethylbenzoyl diphenyl phosphinoxide photoinitiator is commercially available as ADDITOL™ TPO from Cytec or a 1-hydroxy-cyclohexylphenylketone photo initiator is available as ADDITOL™ CPK, also sold by Cytec. Another suitable photoinitiator is a bis(mesitoyl)phenylphosphene oxide (BAPO) commercially available as IRGACURE™ 819.

An electron-beam initiator compound that is reactive to electron-beam energy can be included in the resin composition according to certain variations. While not limiting the present disclosure to any particular theory, it is believed that the direct beam of electrons penetrates the resin composition to create free radicals/cations directly, thus providing enhanced polymerization of the radiation curable polymers. Such electron-beam ("E-beam") active compounds include monomeric and oligomeric active compounds, including mono- and poly-functional monomers. As noted above, the one or more initiator components (c) that are reactive to electron-beam radiation may in fact be the monomers (a) or oligomers (b) already present in uncured resin composition or may be additional initiator components introduced in addition to the monomer(s) (a) and oligomer(s) (b).

For example, such E-beam active materials include monomers of acrylate and low viscosity vinyl materials, which may be the same as or distinct from the acrylate or methacrylate monomers or oligomers described above. Polyfunctional monomers can include polyacrylates. Suitable examples of polyfunctional monomers include alkylenediol diacrylates such as 1,6-hexanediol diacrylate and neopentylglycol diacrylate, cyclohexanedimethanol diacrylate, polyalkylene glycol di(meth)acrylates such as triethylene glycol diacrylate, ether modified monomers such as propoxylated neopentylglycol diacrylate, and higher functionality monomers such as trimethylolpropane triacrylate, trimethylolethane triacrylate, and pentaerythritol tetracrylate, and so on, as well as combinations of such polyfunctional monomers.

The resin composition thus may optionally comprise an active monomer or oligomer as an E-beam initiator compound. Examples of suitable reactive oligomers include, without limitation, oligomers having at least one, preferably more than one, ethylenically unsaturated double bonds, such as acrylated epoxy oligomers, acrylated polyurethane oligomers, acrylated polyesters, and combinations of these. Suitable oligomers have an average functionality of about 1 to about 2. In certain aspects, oligomers having a molecular weight between about 300 and about 500 can be used, for example. The resin compositions of the disclosure can optionally include mixtures and combinations of such E-beam active compounds. Any compound known or to be developed in the art that is reactive to E-beam energy is suitable for use as an initiator component and contemplated by the present disclosure.

As described above, in various aspects, the initiator component is provided in each of the resin compositions to permit sufficient curing. In certain aspects, the resin composition comprises a total amount of initiator component at less than or equal to about 6% by weight of the total resin composition. The resin composition optionally contains a total amount of initiator components at greater than or equal to about 0.2% by weight of the total resin composition to less than or equal to about 6% by weight of the total resin composition; optionally greater than or equal to about 1% by weight of the total resin composition to less than or equal to about 6% by weight of the total resin composition; and in certain variations, optionally greater than or equal to about 2.5% by weight of the total resin composition to less than or equal to about 6% by weight of the total resin composition.

Other optional additives for the resin composition are fiber wetting agents, flame retardants, stabilizers, air release agents, pigments, thickening agents, thinning agents, and de-foaming agents, among others as are well recognized by those of skill in the art. In certain variations, the additives for the resin composition are selected from the group consisting of: fiber wetting agents, pigments, flame retardants, stabilizers, air release agents, de-foaming agents, and combinations thereof. By way of example, a suitable fiber wetting agent like 3-methacryloxypropylmethyldimethoxysilane can be added to improve adhesion between the fiber-based materials and the resin matrix. A fiber wetting agent can also reduce moisture sensitivity and increase the strength of the composite formed. Other optional additives include pigments, such as carbon black, titanium dioxide and aluminum trihydrate, which may be added to render the final product more opaque. Also, aluminum trihydrate may be added to the resin composition, which acts as a flame retardant and stabilizer for the resin matrix. In certain alternative variations, air release agents or defoaming agents may be employed, for example, silicone-containing materials like a EFKA-2721™ solution for defoaming that is commercially available from BASF or non-silicone defoaming/air release additives, like BYK-1790N™ from BYK USA, as well as known commercially available equivalents thereof.

In certain variations, the present disclosure provides a curable pre-impregnated composite precursor that comprises a fiber-based material and an uncured resin composition, which is curable by actinic radiation or electron-beam radiation. In certain variations, the uncured resin composition comprises greater than or equal to about 5% by weight to less than or equal to about 30% by weight of the acrylate or methacrylate monomer (a) in the total resin composition; greater than or equal to about 60% by weight to less than or equal to about 90% by weight of the oligomer species (b) selected from the group consisting of: polyethers, polyesters, epoxies, and combinations thereof; and greater than or equal to about 2.5% by weight to less than or equal to about 6% by weight of the initiator components reactive to the actinic radiation or the electron-beam radiation (c). Such an initiator component may be a photoinitiator making the uncured resin composition curable by exposure to a source of actinic energy. In other variations, the initiator component may be a compound reactive to e-beam energy, which can be the monomer or oligomer species already present or may include additional e-beam reactive initiator components. A balance of the composition may optionally comprise less than or equal to about 10% by weight of the additives described above.

In other variations, the uncured resin composition comprises greater than or equal to about 10% by weight to less than or equal to about 30% by weight of the acrylate or methacrylate monomer (a) in the total resin composition; greater than or equal to about 65% by weight to less than or equal to about 90% by weight of the oligomer species (b) selected from the group consisting of: polyethers, polyesters, epoxies, and combinations thereof; and greater than or equal to about 2.5% by weight to less than or equal to about 6% by weight of the initiator component (c). Such an initiator compound may be a photoinitiator making the uncured resin composition curable by exposure to a source of actinic energy. In other variations, the initiator component may be a compound reactive to e-beam energy, which can be the monomer or oligomer species already present or may include additional e-beam reactive initiator components. A balance of the composition may optionally comprise less than or equal to about 10% by weight of the additives described above.

In certain variations, the uncured resin composition comprises greater than or equal to about 20% by weight to less than or equal to about 30% by weight of the acrylate or methacrylate monomer (a) in the total resin composition; greater than or equal to about 70% by weight to less than or equal to about 80% by weight of the oligomer species (b) selected from the group consisting of: polyethers, polyesters, epoxies, and combinations thereof; and greater than or equal to about 2.5% by weight to less than or equal to about 2.75% by weight of the initiator component (c). Such an initiator component may be a photoinitiator making the uncured resin composition curable by exposure to a source of actinic energy. In other variations, the initiator component may be a compound reactive to e-beam energy, which can be the monomer or oligomer species already present or may include additional e-beam reactive initiator components. A balance of the composition may optionally comprise less than or equal to about 1% by weight of the additives described above.

For example, in one preferred variation, the monomer component (a) comprises two distinct monomers. A first monomer is a bisphenol A ethoxylate diacrylate (commercially available as EBECRYL™ 150 from Cytec) present at about 15% by weight of the total resin composition. A second monomer is a trifunctional ethoxylated (3) trimethylolpropane triacrylate (commercially available as SR-454 from Sartomer) present at about 7.5% by weight of the total resin composition. The oligomer component comprises a bisphenol A epoxy diacrylate (commercially available as EBECRYL™ 3700) present at about 75% by weight of the total resin composition. Three distinct photoinitiators are present in the resin composition, thus making the uncured resin composition UV curable. The first photoinitiator is CPK™ commercially available from Cytec and is present at about 1.9% by weight of the total resin composition, while the second photoinitiator is TPO™ commercially available from Cytec present at about 0.6% by weight of the total resin composition, while the third photoinitiator is IRGACURE™ 819 present at about 0.15% by weight of the total resin composition.

As noted above, FIG. 3 shows a relationship of viscosity to temperature for such a preferred composition according to certain aspects of the present disclosure. A resin ratio (or monomer (a) to oligomer (b)) of between 1:3 and 1:4 (about 1:3.33) is selected, so as to provide a viscosity between 100 and 5,000 cP when the resin is warmed to a temperature between 38° C. (100° F.) and 82° C. (180° F.). The corresponding viscosity when cooled to a temperature of 20° C. (70° F.) is modified to be between 200,000 and 1,000,000 cP. The viscosity when the temperature is reduced to 5° C. (41° F.) is greater than 1,000,000 cP, which is particularly advantageous for use in a curable pre-impregnated composite precursor material for making a composite material.

In certain variations, the uncured resin composition comprises an acrylate or a methacrylate monomer having two or more functional groups (a) selected from the group consisting of: bisphenol A ethoxylate diacrylate, trimethylolpropane ethoxylate triacrylate, and combinations thereof. In other variations, the uncured resin composition comprises an oligomer species selected from the group consisting of: polyethers, polyesters, epoxies, and combinations thereof, having a viscosity of greater than or equal to about at least 200,000 cP at 25° C. (77° F.), where the oligomer species has a molecular weight of about 300 to about 1,000. In certain aspects, the oligomer species is selected from the group consisting of: epoxy acrylate oligomers, polyurethane acrylate oligomers, polyester acrylates, and combinations thereof. In certain variations, the oligomer species (b) further has a viscosity of less than or equal to about 5,000 cP at a temperature of 65° C. (149° F.) or above.

In certain variations, the uncured resin composition consists essentially of: the acrylate or methacrylate monomer having one or more functional groups; the oligomer species selected from the group consisting of: polyethers, polyesters, epoxies, and combinations thereof; one or more initiator compounds reactive to actinic radiation or electron-beam radiation; and an additive selected from the group consisting of: fiber wetting agents, pigments, flame retardants, stabilizers, air release agents, de-foaming agents, and combinations thereof. In certain aspects, the acrylate or methacrylate monomer has two or more functional groups.

In certain variations, the uncured resin composition consists essentially of: an acrylate or a methacrylate monomer having one or more functional groups (a) selected from the group consisting of: bisphenol A ethoxylate diacrylate, trimethylolpropane ethoxylate triacrylate, and combinations thereof, and (b) an oligomer species selected from the group consisting of: polyethers, polyesters, epoxies, and combinations thereof; (c) one or more initiator compounds reactive to actinic radiation or electron-beam radiation, such as one or more photoinitiators, with the understanding that the one or more initiator compounds may be monomer(s) (a) or oligomer(s) (b) or additional initiator compounds; and (d) one or more additives for the resin composition selected from the group consisting of: fiber wetting agents, pigments, flame retardants, stabilizers, air release agents, de-foaming agents, and combinations thereof. In certain aspects, the acrylate or methacrylate monomer has two or more functional groups. In certain variations, the oligomer species is selected from the group consisting of: epoxy acrylate oligomers, polyurethane acrylate oligomers, polyester acrylates, and combinations thereof.

In other variations, the uncured resin composition comprises an oligomer species selected from the group consisting of: polyethers, polyesters, epoxies, and combinations thereof, having a viscosity of greater than or equal to about at least 200,000 cP at 25° C., where the oligomer species has a molecular weight of about 300 to about 1,000. In certain aspects, the oligomer species is selected from the group consisting of: epoxy acrylate oligomers, polyurethane acrylate oligomers, polyester acrylates, and combinations thereof.

However, in accordance with certain aspects of the disclosure, the resin composition is substantially free of certain compounds or species. The term "substantially free" as referred to herein is intended to mean that the compound or species is absent to the extent that undesirable and/or detrimental effects are negligible or nonexistent. In certain aspects, a resin composition that is "substantially free" of such compounds comprises less than or equal to about 3% by weight of a species, more preferably less than or equal to about 2% by weight, optionally less than or equal to about 1% by weight, optionally less than or equal to about 0.5% by weight, optionally less than or equal to about 0.1% by weight, and in certain embodiments 0% by weight of the undesired species.

In certain variations, the uncured resin composition used to form the curable pre-impregnated composite precursor material is substantially free of cured or partially cured monomers and/or oligomers. Further, in certain variations, the uncured resin composition of the present teachings is free of thixotropic agents, gelation agents, or thickening agents. In one variation, the uncured resin composition is substantially free of thickening agents, such as magnesium oxide (MgO). Thus, the inventive uncured resin compositions are capable of having the desired temperature controlled viscosity without need for partial curing or external agents, like thickeners.

In certain embodiments, the present disclosure provides methods of preparing a pre-impregnated composite precursor material. In one variation, a fiber-based substrate material is a pre-preg tow material. An uncured resin composition can be heated to a first temperature so that the uncured resin composition exhibits a first dynamic viscosity of less than or equal to about 5,000 centipoise (cP). For example, a resin composition according to any of the variations described above can be placed into a heated bath. The uncured resin composition comprises (a) an acrylate or a methacrylate monomer; and (b) an oligomer species selected from the group consisting of: polyethers, polyesters, epoxies, and combinations thereof. In certain aspects, the acrylate or methacrylate monomer has two or more functional groups. In certain variations, the uncured resin composition further comprises an initiator component reactive to the actinic radiation or the electron-beam radiation. As noted above, suitable curable resin systems are taken from the families of polyethers, polyesters, and epoxies along with multifunctional (meth)acrylic monomers, optionally may include one or more initiator compounds, and optionally other additives (e.g., for air release, fiber wetting, or other functions). Such a resin composition is radiation curable (such as by e-beam or UV radiation). In certain aspects, a viscosity of the oligomer is too high for it to pour at ambient temperature (typically greater than $10^5$ cP). However, when combined with the (meth)acrylic monomers (having a typical viscosity of 25-350 cP at ambient temperature), the resin can flow at elevated temperatures, but still desirably becomes very viscous at ambient temperatures.

After heating, the method comprises applying the uncured resin composition to a fiber-based substrate material. The fiber-based substrate material is drawn through the heated resin. Metering of the resin onto the fiber-based substrate material can be accomplished through the use of squeegee, opposing rollers or doctor blade, pump, and the like.

The method further comprises cooling the uncured resin composition disposed on the fiber-based substrate material, so that the uncured resin composition exhibits a second dynamic viscosity of greater than or equal to about 200,000 cP. The coated fiber-based substrate material is then cooled in a cooling tunnel. Then the coated fiber-based substrate material is wound up onto a core to form a roll of pre-impregnated composite precursor material, which has the fiber-based substrate material impregnated with the resin composition. The cool roll is optionally stored in an opaque bag (to block transmission of UV radiation) until needed. When needed, the material can be warmed slightly, either on the roll or on a mandrel before cure. Because of the reversible nature of the pre-impregnated composite precursor material system, lower viscosity and good wetting between layers of wrap can be accomplished by this warming process before formation onto a formed or shaped surface, followed by curing.

In certain variations, a composite article may be formed by exposing the uncured resin composition to a source of actinic radiation or electron-beam radiation for a duration of less than or equal to about 60 seconds to form a cured resin composition. In yet other variations, the curable pre-impregnated composite precursor material can be stored for greater than or equal to 6 months and then used to form a composite article by curing the curable pre-impregnated composite precursor material.

Thus, the pre-impregnated composite precursor material (either pre-preg materials of tow or fabric) are then used in composite structures. The pre-impregnated composite precursor materials may be warmed to near ambient conditions or room temperature before use. In various aspects, the pre-impregnated composite precursor materials exhibit a tacky condition. After application to a shaped or formed surface, the pre-impregnated composite precursor materials are cured, either using UV or E-beam or other radiative cure methods depending on the cure initiator used in the formulation.

Pre-impregnated composite precursor materials with resin compositions having properties such as those described above can be used to create impregnated tow or fabric-based materials made of carbon fiber, glass, basalt, aramid, or other fiber types, by way of non-limiting example. These pre-impregnated composite precursor material having uncured resin are stable, capable of containing the resin without movement when stored before use. Storage may be accomplished at room temperature for the highly viscous uncured resin composition systems. For systems of slightly lower viscosity, at room temperature the pre-impregnated composite precursor material may be stored at temperatures below ambient (for example, at commercial refrigeration or freezer conditions to maintain stability). As appreciated by those of skill in the art, stability of the pre-impregnated composite precursor material also depends on type of fiber in the fiber-based substrate material, tow size, fabric size, and percent resin added to the substrate material, for example, and thus storage parameters can be adjusted accordingly. In general, the pre-impregnated composite precursor material made according to the present disclosure is storable for more than 6 months, and in certain preferred aspects, up to 1 year, while maintaining resin properties sufficient for use as structural materials. Further, such pre-impregnated composite precursor materials do not suffer from aging rates that materials thickened by added chemistry do.

The details, examples and preferences provided above in relation to any particular one or more of the stated aspects of the present invention, and described and exemplified below in relation to any particular one or more of the stated aspects of the present invention, apply equally to all aspects of the present invention.

Accordingly, in certain aspects, the present disclosure provides a method of forming a curable pre-impregnated composite precursor material. The method optionally comprises applying an uncured resin composition to a fiber-based substrate material. The uncured resin composition is curable by actinic radiation or electron-beam radiation and comprises: (a) an acrylate or a methacrylate monomer having one or more functional groups; (b) an oligomer species selected from the group consisting of: polyethers, polyesters, epoxies, and combinations thereof, having a viscosity of greater than or equal to about at least 200,000 cP at 25° C. In certain aspects, the acrylate or methacrylate monomer has two or more functional groups. In certain aspects, the uncured resin composition may further comprise (c) one or more initiator component(s) that are reactive to actinic radiation or electron-beam radiation. As noted above, the one or more initiator components (c) that are reactive to electron-beam radiation may in fact be the monomers (a) or oligomers (b) already present in uncured resin composition or may be additional initiator components introduced in addition to the monomer(s) (a) and oligomer(s) (b). In certain variations, the uncured resin composition exhibits a first dynamic viscosity at room temperature of 21° C. (70° F.) of greater than or equal to about 200,000 centipoise (cP) and exhibits a second dynamic viscosity of less than or equal to about 5,000 cP at a temperature of 65° C. (149° F.) or above.

In certain aspects, the acrylate or methacrylate monomer (a) is selected from the group consisting of: bisphenol A ethoxylate diacrylate, trimethylolypropane ethoxylate triacrylate, and combinations thereof. In certain variations, the oligomer species (b) is selected to have a molecular weight of about 300 to about 1,000. In certain embodiments, the oligomer species (b) further has a viscosity of less than or equal to about 5,000 cP at a temperature of 65° C. (149° F.) or above. The oligomer species (b) may be selected from the group consisting of: epoxy acrylate oligomers, polyurethane acrylate oligomers, polyester acrylates, and combinations thereof. In certain aspects, the uncured resin composition has a ratio of monomer species (a) to oligomer species (b) of about 1:10 to about 5:10. In other variations, the uncured resin composition has a ratio of monomer species (a) to oligomer species (b) of about 1:3 to about 1:4.

In certain aspects, the uncured resin composition is selected for having a second dynamic viscosity of less than or equal to about 1,000 cP, optionally less than or equal to about 500 cP at a temperature of 65° C. (149° F.) or above. In other embodiments, the uncured resin composition exhibits the second dynamic viscosity of less than or equal to about 500 cP at the temperature of 75° C. (149° F.) or above. In yet other aspects, the uncured resin composition exhibits the first dynamic viscosity at room temperature of 21° C. (70° F.) of greater than or equal to about 500,000 cP to less than or equal to about 1,000,000 cP.

In certain variations, the uncured resin composition is curable by exposure to actinic radiation and thus comprises at least one photoinitiator component that is reactive to the actinic radiation. In certain variations, where the uncured resin composition comprises at least one photoinitiator component that is reactive to the actinic radiation, the uncured resin composition may comprise greater than or equal to about 5% by weight to less than or equal to about 30% by weight of the acrylate or methacrylate monomer (a) in the total uncured resin composition; greater than or equal to about 60% by weight to less than or equal to about 90% by weight of the oligomer species (b) selected from the group consisting of: polyethers, polyesters, epoxies, and combinations thereof in the total uncured resin composition; and greater than or equal to about 2.5% by weight to less than or equal to about 6% by weight of the initiator component in the total uncured resin composition. In certain variations, the uncured resin composition consists essentially of: (a) the acrylate or methacrylate monomer having two or more functional groups; (b) the oligomer species selected from the group consisting of: polyethers, polyesters, epoxies, and combinations thereof; (c) the initiator components; and (d) an optional additive selected from the group consisting of: fiber wetting agents, pigments, flame retardants, stabilizers, air release agents, de-foaming agents, and combinations thereof.

In other variations, the uncured resin composition is reactive to electron-beam energy and the uncured resin composition comprises at least one component this is reactive to the electron-beam energy. Such a component reactive to electron-beam radiation may be the (a) acrylate or methacrylate monomer and/or the (b) oligomer species selected from the group consisting of: polyethers, polyesters, epoxies, and combinations thereof, or alternatively may be one or more additional initiator components added to promote e-beam curing.

In certain variations, the method may further comprise forming a composite article by curing the uncured resin composition by exposure to a source of actinic radiation or electron-beam radiation for a duration of less than or equal to about 60 seconds, optionally less than or equal to about 30 seconds, and in certain aspects, optionally less than or equal to about 15 seconds. The method may further comprise storing the curable pre-impregnated composite precursor material for greater than or equal to 6 months and then forming a composite article by curing the curable pre-impregnated composite precursor material.

In certain variations, the uncured resin composition consists essentially of: the acrylate or methacrylate monomer having two or more functional groups; the oligomer species selected from the group consisting of: polyethers, polyesters, epoxies, and combinations thereof; the initiator component(s), and one or more additives for the resin composition selected from the group consisting of: fiber wetting agents, pigments, flame retardants, stabilizers, air release agents, de-foaming agents, and combinations thereof. The uncured resin composition optionally comprises greater than or equal to about 5% by weight to less than or equal to about 30% by weight of the acrylate or methacrylate monomer (a) in the total resin composition; greater than or equal to about 60% by weight to less than or equal to about 90% by weight of the oligomer species (b) selected from the group consisting of: polyethers, polyesters, epoxies, and combinations thereof; and greater than or equal to about 2.5% by weight to less than or equal to about 6% by weight of the initiator component reactive to actinic radiation or electron-beam radiation.

In certain aspects, the acrylate or methacrylate monomer (a) is selected from the group consisting of: bisphenol A ethoxylate diacrylate, trimethylolypropane ethoxylate triacrylate, and combinations thereof. In other aspects, the oligomer species (b) has a molecular weight of about 300 to about 1,000. In certain variations, the oligomer species (b) further has a viscosity of less than or equal to about 5,000 cP at a temperature of 65° C. or above. In certain variations, the oligomer species (b) is selected from the group consisting of: epoxy acrylate oligomers, polyurethane acrylate oligomers, polyester acrylates, and combinations thereof.

In certain embodiments, the uncured resin composition exhibits a second dynamic viscosity of less than or equal to about 1,000 cP at the temperature of 65° C. (149° F.) or above. In other embodiments, the uncured resin composition exhibits the second dynamic viscosity of less than or equal to about 500 cP at the temperature of 75° C. (167° F.) or above. In yet other embodiments, the uncured resin composition exhibits the first dynamic viscosity at room temperature of 21° C. (70° F.) of greater than or equal to about 500,000 cP to less than or equal to about 1,000,000 cP.

The methods may optionally further comprise forming a composite article by curing the uncured resin composition by exposure to a source of actinic radiation or electron-beam radiation for a duration of less than or equal to about 60 seconds. In certain aspects, the methods may further comprise storing the curable pre-impregnated composite precursor material for greater than or equal to 6 months, optionally greater than or equal to a year, while the curable pre-impregnated composite precursor material and the uncured resin composition are shelf-stable and do not detrimentally degrade in performance or migrate within the fiber-based material. The method optionally comprises forming a composite article by curing the curable pre-impregnated composite precursor material.

In other aspects, the present disclosure provides a curable pre-impregnated composite precursor material that comprises a fiber-based substrate material and an uncured resin composition curable by actinic radiation or electron-beam radiation. The uncured resin composition comprises (a) an acrylate or a methacrylate monomer having two or more functional groups; and (b) an oligomer species selected from the group consisting of: polyethers, polyesters, epoxies, and combinations thereof. In certain variations, the oligomer species (b) having a viscosity of greater than or equal to about at least 200,000 centipoise (cP) at 25° C. (77° F.). Further, the uncured resin composition exhibits a first dynamic viscosity at room temperature (about 21° C. (70° F.)) of greater than or equal to about 200,000 cP and exhibits a second dynamic viscosity of less than or equal to about 5,000 cP at a temperature of 65° C. (149° F.) or above.

In various aspects, the uncured resin composition of the curable pre-impregnated composite precursor material has a ratio of monomer species (a) to oligomer species (b) of about 1:10 to about 5:10. In yet other aspects, the uncured resin composition may have a ratio of monomer species (a) to oligomer species (b) of about 1:3 to about 1:4. In certain aspects, the acrylate or methacrylate monomer (a) is selected from the group consisting of: bisphenol A ethoxylate diacrylate, trimethylolypropane ethoxylate triacrylate, and combinations thereof. In certain variations, the oligomer species (b) is selected to have a molecular weight of about 300 to about 1,000. In certain embodiments, the oligomer species (b) further has a viscosity of less than or equal to about 5,000 cP at a temperature of 65° C. (149° F.) or above. The oligomer species (b) may be selected from the group consisting of: epoxy acrylate oligomers, polyurethane acrylate oligomers, polyester acrylates, and combinations thereof.

In certain embodiments, the uncured resin composition of the curable pre-impregnated composite precursor material exhibits a second dynamic viscosity of less than or equal to about 3,000 cP at the temperature of 65° C. (149° F.) or above. In certain embodiments, the uncured resin composition exhibits a second dynamic viscosity of less than or equal to about 2,000 cP at the temperature of 65° C. (149° F.) or above. In certain embodiments, the uncured resin composition exhibits a second dynamic viscosity of less than or equal to about 1,000 cP at the temperature of 65° C. (149° F.) or above. In other embodiments, the uncured resin composition exhibits the second dynamic viscosity of less than or equal to about 500 cP at the temperature of 75° C. (149° F.) or above.

In certain embodiments, the uncured resin composition exhibits a first dynamic viscosity of greater than or equal to about 400,000 cP at room temperature (about 21° C. (70° F.)) or above. In certain embodiments, the uncured resin composition exhibits a first dynamic viscosity of greater than or equal to about 600,000 cP at room temperature (about 21° C. (70° F.)) or above. In yet other embodiments, the uncured resin composition exhibits the first dynamic viscosity at room temperature (about 21° C. (70° F.)) of greater than or equal to about 500,000 cP to less than or equal to about 1,000,000 cP.

In certain aspects, the uncured resin composition of the curable pre-impregnated composite precursor material is reactive to actinic radiation. The uncured resin composition may comprise at least one photoinitiator component that is reactive to the actinic radiation. In certain variations, where the uncured resin composition comprises at least one photoinitiator component that is reactive to the actinic radiation, the uncured resin composition may comprise greater than or equal to about 5% by weight to less than or equal to about 30% by weight of the acrylate or methacrylate monomer (a) in the total uncured resin composition; greater than or equal to about 60% by weight to less than or equal to about 90% by weight of the oligomer species (b) selected from the group consisting of: polyethers, polyesters, epoxies, and combinations thereof in the total uncured resin composition; and greater than or equal to about 2.5% by weight to less than or equal to about 6% by weight of the initiator component in the total uncured resin composition. In certain embodiments, the uncured resin composition consists essentially of: (a) the acrylate or methacrylate monomer having two or more functional groups; (b) the oligomer species selected from the group consisting of: polyethers, polyesters, epoxies, and combinations thereof; (c) the initiator components; and (d) an optional additive selected from the group consisting of: fiber wetting agents, pigments, flame retardants, stabilizers, air release agents, de-foaming agents, and combinations thereof.

In certain alternative aspects, the uncured resin composition of the curable pre-impregnated composite precursor material is curable by exposure to electron-beam energy and the uncured resin composition comprises at least one component reactive to the electron-beam energy.

In certain aspects, the present disclosure also provides methods for forming a curable pre-impregnated composite precursor material that may comprise heating an uncured resin composition to a first temperature so that the uncured resin composition exhibits a first dynamic viscosity of less than or equal to about 5,000 centipoise (cP). In certain aspects, such a first temperature is greater than or equal to about 65° C. (149° F.). In certain aspects, the first temperature may be 75° C. (167° F.). In certain aspects, the heating of the uncured resin composition occurs until the first dynamic viscosity is less than or equal to about 3,000 cP. In other aspects, the heating of the uncured resin composition occurs until the first dynamic viscosity is less than or equal to about 1,000 cP.

The uncured resin composition comprises (a) an acrylate or a methacrylate monomer; and (b) an oligomer species selected from the group consisting of: polyethers, polyesters, epoxies, and combinations thereof. In certain aspects, the acrylate or methacrylate monomer has two or more functional groups. In certain aspects, the acrylate or methacrylate monomer has two or more functional groups. In certain variations, the uncured resin composition may further comprise (c) one or more initiator component(s) that are reactive to actinic radiation or electron-beam radiation. As noted above, the one or more initiator components (c) that are reactive to electron-beam radiation may in fact be the monomers (a) or oligomers (b) already present in uncured resin composition or may be additional initiator components introduced in addition to the monomer(s) (a) and oligomer(s) (b). In certain aspects, the uncured resin composition has a ratio of monomer species (a) to oligomer species (b) of about 1:10 to about 5:10. In other variations, the uncured resin composition has a ratio of monomer species (a) to oligomer species (b) of about 1:3 to about 1:4.

The method further comprises applying the uncured resin composition to a fiber-based substrate material. The uncured resin composition is thus wetted out onto and/or into the fiber-based substrate material and thus may be coated on a surface thereof and/or imbibed/impregnated into the fiber-based substrate material. Next, the method further comprises cooling the uncured resin composition disposed on the fiber-based substrate material, so that the uncured resin composition exhibits a second dynamic viscosity of greater than or equal to about 200,000 cP. The cooling may be to a second temperature that is at ambient conditions, e.g., room temperature, about 21° C. (70° F.). In certain aspects, the cooling occurs until the uncured resin composition exhibits a second dynamic viscosity of greater than or equal to about 400,000 cP. In yet other aspects, the cooling occurs until the uncured resin composition exhibits a second dynamic viscosity of greater than or equal to about 600,000 cP. In certain variations, the second dynamic viscosity at room temperature (about 21° C. (70° F.)) is greater than or equal to about 500,000 cP to less than or equal to about 1,000,000 cP. The first temperature to which the uncured resin is heated may be greater than or equal to about 65° C. (149° F.) and the uncured resin composition may be cooled to a second temperature of less than or equal to about 21° C. (70° F.) in certain embodiments.

In certain aspects, the uncured resin composition used in such a method for forming the curable pre-impregnated composite precursor material is reactive to actinic radiation. Thus, the uncured resin composition can comprise at least one photoinitiator compound that is reactive to the actinic radiation. In such embodiments, the uncured resin composition may comprise greater than or equal to about 5% by weight to less than or equal to about 30% by weight of the acrylate or methacrylate monomer (a) in the total uncured resin composition; greater than or equal to about 60% by weight to less than or equal to about 90% by weight of the oligomer species (b) selected from the group consisting of: polyethers, polyesters, epoxies, and combinations thereof in the total uncured resin composition; and greater than or equal to about 2.5% by weight to less than or equal to about 6% by weight of the initiator component (c) in the total uncured resin composition. In certain embodiments, the uncured resin composition may consist essentially of: (a) the acrylate or methacrylate monomer having two or more functional groups; (b) the oligomer species selected from the group consisting of: polyethers, polyesters, epoxies, and combinations thereof; (c) the at least one initiator component or multiple initiator components; and (d) an optional additive selected from the group consisting of: fiber wetting agents, pigments, flame retardants, stabilizers, air release agents, de-foaming agents, and combinations thereof.

In other variations, the uncured resin composition is reactive to electron-beam energy and the uncured resin composition comprises at least one component this is reactive to the electron-beam energy. Such a component reactive to electron-beam radiation may be the (a) acrylate or methacrylate monomer and/or the (b) oligomer species selected from the group consisting of: polyethers, polyesters, epoxies, and combinations thereof, or alternatively may be one or more additional initiator components added to promote e-beam curing.

In certain aspects, the acrylate or methacrylate monomer (a) is selected from the group consisting of: bisphenol A ethoxylate diacrylate, trimethylolypropane ethoxylate triacrylate, and combinations thereof. In certain variations, the oligomer species (b) further has a viscosity of less than or equal to about 5,000 cP at a temperature of 65° C. (149° F.) or above. In other aspects, the oligomer species (b) has a molecular weight of about 300 to about 1,000. In certain variations, the oligomer species (b) is selected from the group consisting of: epoxy acrylate oligomers, polyurethane acrylate oligomers, polyester acrylates, and combinations thereof.

The methods may optionally further comprise forming a composite article by curing the uncured resin composition by exposure to a source of actinic radiation or electron-beam radiation for a duration of less than or equal to about 60 seconds. In certain aspects, the methods may further comprise storing the curable pre-impregnated composite precursor material for greater than or equal to 6 months, optionally greater than or equal to a year, while the curable pre-impregnated composite precursor material and the uncured resin composition are shelf-stable and do not detrimentally degrade in performance or migrate within the fiber-based material. The method optionally comprises forming a composite article by curing the curable pre-impregnated composite precursor material.

In certain aspects, the uncured resin composition may further comprise (c) one or more initiator component(s) that are reactive to actinic radiation or electron-beam radiation. As noted above, the one or more initiator components (c) that are reactive to electron-beam radiation may in fact be the monomers (a) or oligomers (b) already present in uncured resin composition or may be additional initiator components introduced in addition to the monomer(s) (a) and oligomer(s) (b). The uncured resin composition exhibits a first dynamic viscosity at room temperature of 21° C. (70° F.) of greater than or equal to about 200,000 centipoise (cP) and exhibits a second dynamic viscosity of less than or equal to about 5,000 cP at a temperature of 65° C. (149° F.) or above. In various aspects, the uncured resin composition has a ratio of monomer species (a) to oligomer species (b) of about 1:10 to about 5:10. In other variations, the uncured resin composition has a ratio of monomer species (a) to oligomer species (b) of about 1:3 to about 1:4.

In other aspects, the present disclosure provides a method of forming a curable pre-impregnated composite precursor material, which comprises applying an uncured resin composition to a fiber-based substrate material. The uncured resin composition is curable by actinic radiation or electron-beam radiation and comprises: (a) an acrylate or a methacrylate monomer selected from the group consisting of: bisphenol A ethoxylate diacrylate, trimethylolypropane ethoxylate triacrylate, and combinations thereof; (b) an oligomer species selected from the group consisting of: epoxy acrylate oligomers, polyurethane acrylate oligomers, polyester acrylates, and combinations thereof, wherein the oligomer species is selected to have a first dynamic viscosity of greater than or equal to about at least 200,000 cP at 25° C. and a second dynamic viscosity of less than or equal to about 5,000 cP at a temperature of 65° C. or above; and (c) one or more initiator components. The uncured resin composition exhibits a first dynamic viscosity at room temperature of 21° C. (70° F.) of greater than or equal to about 200,000 centipoise (cP) and exhibits a second dynamic viscosity of less than or equal to about 1,000 cP at a temperature of 65° C. (149° F.) or above. In certain aspects, the uncured resin composition has a ratio of monomer species (a) to oligomer species (b) of about 1:10 to about 5:10. In certain other aspects, the uncured resin composition may have a ratio of monomer species (a) to oligomer species (b) of about 1:3 to about 1:4.

In such methods, the uncured resin composition can exhibit a first dynamic viscosity at room temperature of 21° C. (70° F.) of greater than or equal to about 500,000 centipoise (cP) and exhibits a second dynamic viscosity of less than or equal to about 500 cP at a temperature of 65° C. (149° F.) or above. In certain other variations, the uncured resin composition can exhibit a first dynamic viscosity at room temperature of 21° C. (70° F.) of greater than or equal to about 100,000 centipoise (cP) and a second dynamic viscosity of less than or equal to about 500 cP at a temperature of 75° C. (167° F.) or above.

In yet other aspects, the present teachings provide a method of making a composite article from a curable pre-impregnated composite precursor material, where the method comprises disposing a curable pre-impregnated composite precursor material comprising an uncured resin composition and a fiber-based substrate material on a shaped surface. The uncured resin composition comprises: (a) an acrylate monomer or a methacrylate monomer having one or more functional groups; (b) an oligomer species selected from the group consisting of: polyethers, polyesters, epoxies, and combinations thereof; and (c) optionally an initiator component reactive to actinic radiation or electron-beam radiation. In certain aspects, the uncured resin composition may exhibit a first dynamic viscosity at room temperature (about 21° C. (70° F.)) of greater than or equal to about 100,000 centipoise (cP), but exhibits a second dynamic viscosity at a temperature of greater than or equal to about 75° C. (167° F.) of less than or equal to about 500 cP. The method further comprises exposing the curable pre-impregnated composite precursor material on the shaped surface to a source of actinic radiation or electron-beam radiation for a duration of less than or equal to about 60 seconds, optionally less than or equal to about 30 seconds, and optionally less than or equal to about 15 seconds, so as to cure the resin composition and thus form the composite article.

In certain variations, the shaped surface may remain as part of the final composite article that is formed, such as in filament winding on a liner or mandrel. For example, the shaped surface may require structural reinforcement by having the curable pre-impregnated composite precursor material applied thereon (e.g., by wrapping a tube or spherical shell) or can be a sub-assembly of parts to be held together by the cured composite material, by way of non-limiting example. Thus, in certain variations, the final composite article that is formed after curing the curable pre-impregnated composite precursor material comprises the shaped surface, the cured resin composition, and the fiber-based substrate material. However, in other alternative variations, the method also comprises removing the composite material from the shaped surface after curing. In such an embodiment, the final composite article comprises the cured resin composition and fiber-based substrate material, which has been removed from the shaped surface.

All possible combinations of the enumerated optional features of these curable pre-impregnated composite precursor material and composites incorporating such materials are specifically disclosed as embodiments. Also specifically disclosed are combinations, including methods for making curable pre-impregnated composite precursor material and the curable pre-impregnated composite precursor material, with any one or any combination of more than one of the enumerated features described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a curable pre-impregnated composite precursor material, the method comprising:
   heating an uncured resin composition to a first temperature so that the uncured resin composition exhibits a first dynamic viscosity of less than or equal to about 5,000 centipoise (cP), wherein the uncured resin composition is curable by actinic radiation or electron-beam radiation and comprises:
   (a) an acrylate or a methacrylate monomer having two or more functional groups; and
   (b) an oligomer species selected from the group consisting of: polyethers, polyesters, epoxies, and combinations thereof;
   applying the uncured resin composition to a fiber-based substrate material; and
   cooling the uncured resin composition disposed on the fiber-based substrate material to form the curable pre-impregnated composite precursor material, so that the uncured resin composition exhibits a second dynamic viscosity of greater than or equal to about 200,000 cP to less than 1,000,000 cP at room temperature of about 21° C. (70° F.).

2. The method of claim 1, wherein the heating of the uncured resin composition occurs until the first dynamic viscosity is less than or equal to about 3,000 cP.

3. The method of claim 1, wherein the heating of the uncured resin composition occurs until the first dynamic viscosity is less than or equal to about 1,000 cP.

4. The method of claim 1, wherein the cooling occurs until the uncured resin composition exhibits a second dynamic viscosity of greater than or equal to about 400,000 cP to less than 1,000,000 cP.

5. The method of claim 1, wherein the cooling occurs until the uncured resin composition exhibits a second dynamic viscosity of greater than or equal to about 600,000 cP to less than 1,000,000 cP.

6. The method of claim 1, wherein the first temperature is greater than or equal to about 65° C. (149° F.).

7. The method of claim 1, further comprising forming a composite article by exposing the uncured resin composition to a source of actinic radiation or electron-beam radiation for a duration of less than or equal to about 60 seconds to form a cured resin composition.

8. The method of claim 1, wherein the uncured resin composition further comprises at least one photoinitiator component reactive to the actinic radiation, wherein the uncured resin composition comprises greater than or equal to about 5% by weight to less than or equal to about 30% by weight of the acrylate or methacrylate monomer (a) in the total uncured resin composition; greater than or equal to about 60% by weight to less than or equal to about 90% by weight of the oligomer species (b) selected from the group consisting of: polyethers, polyesters, epoxies, and combinations thereof in the total uncured resin composition; and greater than or equal to about 2.5% by weight to less than or equal to about 6% by weight of the at least one photoinitiator component in the total uncured resin composition.

9. The method of claim 1, further comprising storing the curable pre-impregnated composite precursor material for greater than or equal to 6 months and then forming a composite article by curing the curable pre-impregnated composite precursor material.

10. The method of claim 1, wherein the acrylate or a methacrylate monomer is selected from the group consisting of: bisphenol A ethoxylate diacrylate, bisphenol A ethoxylate dimethacrylate, bisphenol A propoxylate diacrylate, bisphenol A propoxylate dimethacrylate, $C_6$-$C_{12}$ hydrocarbon diol diacrylate, $C_6$-$C_{12}$ hydrocarbon diol dimethacrylate, tripropylene glycol diacrylate, tripropylene glycol dimethacrylate, neopentyl glycol diacrylate, neopentyl glycol dimethacrylate, trimethylolpropane triacrylate, trimethylolethane triacrylate, pentaerythritol tetracrylate, neopentyl glycol propoxylate diacrylate, neopentyl glycol propoxylate dimethacrylate, neopentyl glycol ethoxylate diacrylate, neopentyl glycol ethoxylate dimethacrylate, trimethylolypropane triethoxylate triacrylate, trimethylolypropane trimethoxylate triacrylate, pentaerythritol tetraethoxylate tetraacrylate, polyalkylene glycol di(meth)acrylates, triethylene glycol diacrylate, polyethylene glycol nonylphenylether acrylate, polyethylene glycol nonylphenylether methacrylate, polypropylene glycol nonylphenylether acrylate, polypropylene glycol nonylphenylether methacrylate, isobornyl acrylate, and combinations thereof; and
the oligomer species is selected from the group consisting of: bisphenol A epoxy resin, bisphenol F epoxy resin, alicyclic epoxy resin, bisphenol A epoxy resin acrylates or methacrylates, alkoxylated bisphenol epoxy resin acrylates or methacrylates, alkyl epoxy resin, bisphenol A diacrylate, propoxylated bisphenol A di(meth)acrylate, ethoxylated bisphenol A di(meth)acrylate, bisphenol F diacrylate, ethoxylated bisphenol F diacrylate, propoxylated bisphenol F diacrylate, polyether-based (meth)acrylate oligomers, urethane acrylate oligomers, and combinations thereof.

11. The method of claim 1, wherein the uncured resin composition has a ratio of monomer species (a) to oligomer species (b) of about 1:10 to about 5:10, the acrylate or a methacrylate monomer (a) is selected from the group consisting of: bisphenol A ethoxylate diacrylate, a trimethylolypropane ethoxylate triacrylate, and combinations thereof and the oligomer species (b) is selected from the group consisting of: epoxy acrylate oligomers, polyurethane acrylate oligomers, polyester acrylates, and combinations thereof.

12. The method of claim 1, wherein the oligomer species (b) comprises a difunctional epoxy acrylate-bisphenol A epoxy oligomer having a third dynamic viscosity of about 800,000 cP at 25° C. (77° F.) and a fourth dynamic viscosity of about 2,317 cP at a temperature of about 65° C. (149° F.).

13. A method of forming a curable pre-impregnated composite precursor material, the method comprising:
applying an uncured resin composition to a fiber-based substrate material to form the curable pre-impregnated composite precursor material, wherein the uncured resin composition is curable by actinic radiation or electron-beam radiation and comprises:
(a) an acrylate or a methacrylate monomer having two or more functional groups selected from the group consisting of: bisphenol A ethoxylate diacrylate, trimethylolypropane ethoxylate triacrylate, and combinations thereof; and
(b) an oligomer species selected from the group consisting of: polyethers, polyesters, epoxies, and combinations thereof, having a viscosity of greater than or equal to about at least 200,000 centipoise (cP) at 25° C. (77° F.);
wherein the acrylate or a methacrylate monomer is and the oligomer species comprises a difunctional epoxy acrylate oligomer-bisphenol A epoxy oligomer having a third dynamic viscosity of about 800,000 cP at 25° C. (77° F.) and a fourth dynamic viscosity of about 2,317 cP at a temperature of about 65° C. (149° F.)
wherein the uncured resin composition exhibits a first dynamic viscosity at room temperature (about 21° C. (70° F.)) of greater than or equal to about 200,000 cP to less than 1,000,000 cP and exhibits a second dynamic viscosity of less than or equal to about 5,000 cP at a temperature of about 65° C. (149° F.) or above.

14. The method of claim 13, wherein the uncured resin composition further comprises at least one photoinitiator component that is reactive to the actinic radiation, wherein the uncured resin composition comprises greater than or equal to about 5% by weight to less than or equal to about 30% by weight of the acrylate or methacrylate monomer (a) in the total uncured resin composition; greater than or equal to about 60% by weight to less than or equal to about 90% by weight of the oligomer species (b) selected from the group consisting of: polyethers, polyesters, epoxies, and combinations thereof in the total uncured resin composition; and greater than or equal to about 2.5% by weight to less than or equal to about 6% by weight of the at least one photoinitiator component in the total uncured resin composition.

15. The method of claim 13, wherein the uncured resin composition further comprises at least one photoinitiator component that is reactive to the actinic radiation, wherein the uncured resin composition consists essentially of: (a) the acrylate or methacrylate monomer having two or more functional groups; (b) the oligomer species selected from the group consisting of: polyethers, polyesters, epoxies, and combinations thereof; the at least one photoinitiator component; and an optional additive selected from the group consisting of: fiber wetting agents, pigments, flame retardants, stabilizers, air release agents, de-foaming agents, and combinations thereof.

16. The method of claim 13, wherein the uncured resin composition is reactive to electron-beam energy and the uncured resin composition comprises at least one component that is reactive to the electron-beam energy.

17. The method of claim 13, wherein the uncured resin composition has a ratio of monomer species (a) to oligomer species (b) of about 1:10 to about 5:10 and the oligomer species (b) is selected from the group consisting of: epoxy acrylate oligomers, polyurethane acrylate oligomers, polyester acrylates, and combinations thereof.

18. A method of making a composite article from a curable pre-impregnated composite precursor material, the method comprising:
disposing the curable pre-impregnated composite precursor material comprising an uncured resin composition and a fiber-based substrate material on a shaped surface, wherein the uncured resin composition is curable by actinic radiation or electron-beam radiation and comprises:
(a) an acrylate or a methacrylate monomer having one or more functional groups selected from the group consisting of: bisphenol A ethoxylate diacrylate, trimethylolypropane ethoxylate triacrylate, and combinations thereof; and (b) an oligomer species selected from the group consisting of: polyethers, polyesters, epoxies, and combinations thereof;

wherein the uncured resin composition exhibits a first dynamic viscosity at room temperature of 21° C. (70° F.) of greater than or equal to about 100,000 centipoise (cP) to less than or equal to about 1,000,000 cP, but exhibits a second dynamic viscosity at a temperature of greater than or equal to about 75° C. (167° F.) of less than or equal to about 500 cP; and exposing the curable pre-impregnated composite precursor material on the shaped surface to a source of actinic radiation or electron-beam radiation for a duration of less than or equal to about 60 seconds so as to cure the resin composition and form the composite article.

19. The method of claim 18, wherein the composite article comprises the shaped surface, the cured resin composition, and the fiber-based substrate material.

20. The method of claim 18, wherein the uncured resin composition comprises at least one photoinitiator component that is reactive to the actinic radiation, wherein the uncured resin composition comprises greater than or equal to about 5% by weight to less than or equal to about 30% by weight of the acrylate or methacrylate monomer (a) in the total uncured resin composition; greater than or equal to about 60% by weight to less than or equal to about 90% by weight of the oligomer species (b) selected from the group consisting of: polyethers, polyesters, epoxies, and combinations thereof in the total uncured resin composition; and greater than or equal to about 2.5% by weight to less than or equal to about 6% by weight of the at least one photoinitiator component in the total uncured resin composition.

21. The method of claim 18, wherein the uncured resin composition comprises at least one photoinitiator component that is reactive to the actinic radiation, wherein the uncured resin composition consists essentially of: (a) the acrylate or methacrylate monomer having two or more functional groups; (b) the oligomer species selected from the group consisting of: polyethers, polyesters, epoxies, and combinations thereof; the at least one photoinitiator component; and an optional additive selected from the group consisting of: fiber wetting agents, pigments, flame retardants, stabilizers, air release agents, de-foaming agents, and combinations thereof.

22. The method of claim 18, wherein the uncured resin composition has a ratio of monomer species (a) to oligomer species (b) of about 1:10 to about 5:10 and the oligomer species (b) is selected from the group consisting of: epoxy acrylate oligomers, polyurethane acrylate oligomers, polyester acrylates, and combinations thereof.

23. The method of claim 18, wherein the oligomer species (b) comprises a difunctional epoxy acrylate - bisphenol A epoxy oligomer having a third dynamic viscosity of about 800,000 cP at 25° C. (77° F.) and a fourth dynamic viscosity of about 2,317 cP at a temperature of about 65° C. (149° F.).

* * * * *